United States Patent
Tanabe et al.

(10) Patent No.: US 11,951,920 B2
(45) Date of Patent: Apr. 9, 2024

(54) OPERATION DEVICE AND VEHICLE DOOR

(71) Applicant: TS TECH CO., LTD., Asaka (JP)

(72) Inventors: Jinichi Tanabe, Tochigi (JP);
Takayoshi Ito, Tochigi (JP); Kazumasa Narita, Tochigi (JP); Yuma Miyamoto, Tochigi (JP); Akihito Kobayashi, Tochigi (JP); Kodai Matsumoto, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 388 days.

(21) Appl. No.: 17/438,758

(22) PCT Filed: Mar. 13, 2020

(86) PCT No.: PCT/JP2020/011033
§ 371 (c)(1),
(2) Date: Sep. 13, 2021

(87) PCT Pub. No.: WO2020/184702
PCT Pub. Date: Sep. 17, 2020

(65) Prior Publication Data
US 2022/0153214 A1    May 19, 2022

Related U.S. Application Data

(60) Provisional application No. 62/818,200, filed on Mar. 14, 2019.

(30) Foreign Application Priority Data

Aug. 26, 2019   (JP) .................................. 2019-154106
Sep. 24, 2019   (JP) .................................. 2019-172943

(51) Int. Cl.
*B60R 16/037*    (2006.01)
*B60Q 3/267*     (2017.01)
(Continued)

(52) U.S. Cl.
CPC ............ *B60R 16/037* (2013.01); *B60Q 3/267* (2017.02); *B60Q 3/64* (2017.02); *B60Q 3/80* (2017.02);
(Continued)

(58) Field of Classification Search
CPC .......... B60R 16/037; B60R 16/02; B60J 5/04; B60Q 3/64; B60Q 3/80; B60Q 3/267;
(Continued)

(56) References Cited

U.S. PATENT DOCUMENTS

2005/0004724 A1 *  1/2005  Fehr ........................ H01H 21/24
                                                             701/29.1
2012/0133169 A1    5/2012  George et al.
(Continued)

FOREIGN PATENT DOCUMENTS

DE    102017125984 A1 *  5/2018  ............... B60Q 3/64
DE    102017214426 A1 *  2/2019  ............. B60K 35/00
(Continued)

OTHER PUBLICATIONS

Japanese Office Action (w/ English translation) for JP Application No. 2019-172943, dated Jul. 4, 2023, 10 pages.
(Continued)

*Primary Examiner* — Lori Lyjak
(74) *Attorney, Agent, or Firm* — Dority & Manning, P.A.

(57) ABSTRACT

The present invention relates to an operation device which can be easily installed on a vehicle door, and a vehicle door comprising the operation device. An operation device of the present invention comprises: a gripper provided on an inner surface of a door of a vehicle; an operation interface provided on an inner side surface of the gripper for receiving an operation input entered by an occupant to operate at least one in-vehicle device; a first sensor provided on an outer side surface of the gripper for detecting a finger of the
(Continued)

occupant; a second sensor provided on at least one of the inner side surface and an upper surface of the gripper for detecting a finger of the occupant; and a controller connected to the operation interface, the first sensor, the second sensor, and the at least one in-vehicle device. The controller controls the at least one in-vehicle device based on a signal from the operation interface when both the first sensor and the second sensor detect the occupant, and prohibits the at least one in-vehicle device from being controlled based on a signal from the operation interface when at least one of the first sensor and the second sensor does not detect the occupant.

15 Claims, 27 Drawing Sheets

(51) Int. Cl.
    *B60Q 3/64*     (2017.01)
    *B60Q 3/80*     (2017.01)
    *E05B 81/76*     (2014.01)
    *E05F 15/695*     (2015.01)
    *E05F 15/73*     (2015.01)

(52) U.S. Cl.
    CPC .............. *E05B 81/76* (2013.01); *E05F 15/695* (2015.01); *E05F 15/73* (2015.01)

(58) Field of Classification Search
    CPC ........ B60Q 3/233; E05F 15/695; E05F 15/73; E05B 81/76; E05B 81/77; E05B 85/12; B60K 2370/143; B60K 2370/199; B60K 2370/794; B60K 2370/1434; B60K 37/06; H01H 9/02
See application file for complete search history.

(56) References Cited

U.S. PATENT DOCUMENTS

| | | | | |
|---|---|---|---|---|
| 2016/0251880 | A1* | 9/2016 | Bingle | .................... E05B 81/76 701/49 |
| 2017/0210275 | A1* | 7/2017 | Kubo | ........................ B60Q 3/54 |
| 2017/0217364 | A1* | 8/2017 | Noboritate | ............... B60Q 3/66 |
| 2018/0252005 | A1 | 9/2018 | Magner et al. | |
| 2019/0210458 | A1* | 7/2019 | Harris | ................... F16H 59/044 |

FOREIGN PATENT DOCUMENTS

| | | | | |
|---|---|---|---|---|
| JP | 2009-083780 | | 4/2009 | |
| JP | 2010-235095 | | 10/2010 | |
| JP | 2012515104 | A | 7/2012 | |
| JP | 2013249593 | A | 12/2013 | |
| JP | 2015202827 | A | 11/2015 | |
| JP | 2017-114382 | | 6/2017 | |
| JP | 2018-188824 | | 11/2018 | |
| WO | WO-2008154378 | A1 * | 12/2008 | ............... B60Q 3/14 |
| WO | WO-2018013557 | A1 * | 1/2018 | ........... B32B 27/065 |

OTHER PUBLICATIONS

PCT International Search Report (w/ English translation) for corresponding PCT Application No. PCT/JP2020/011033, dated Jun. 2, 2020. 5 pages.

* cited by examiner

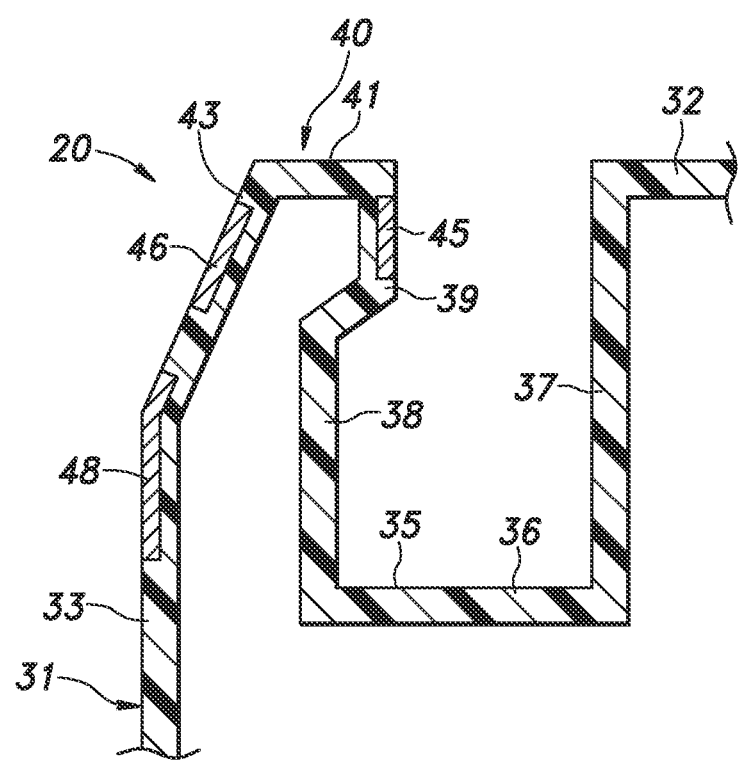

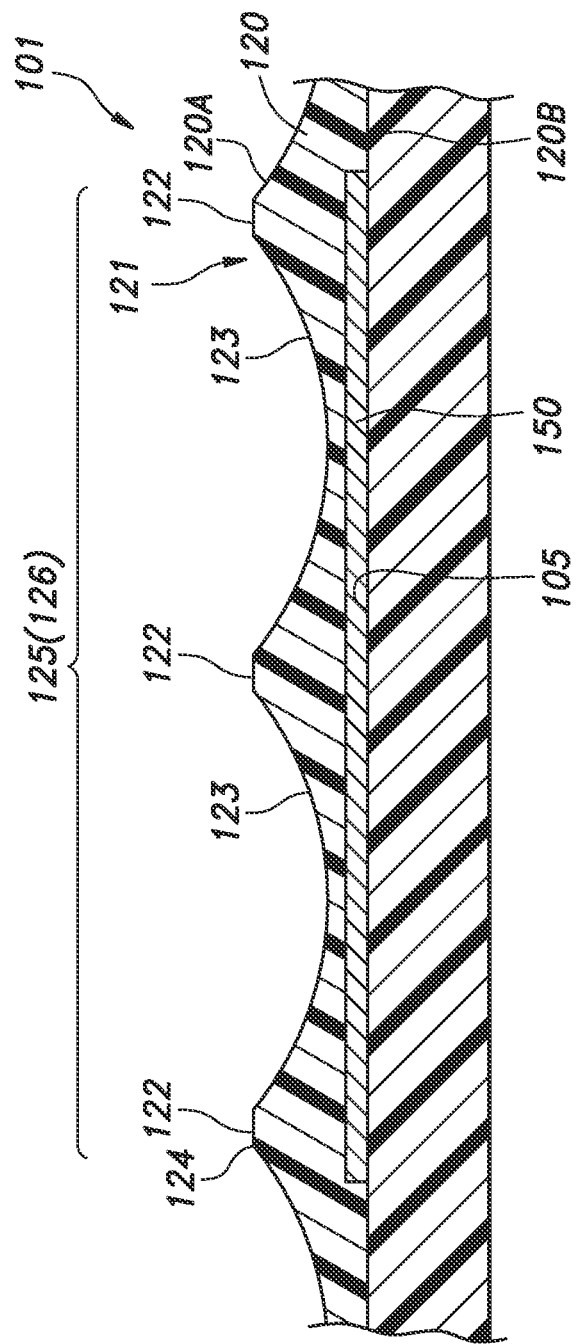

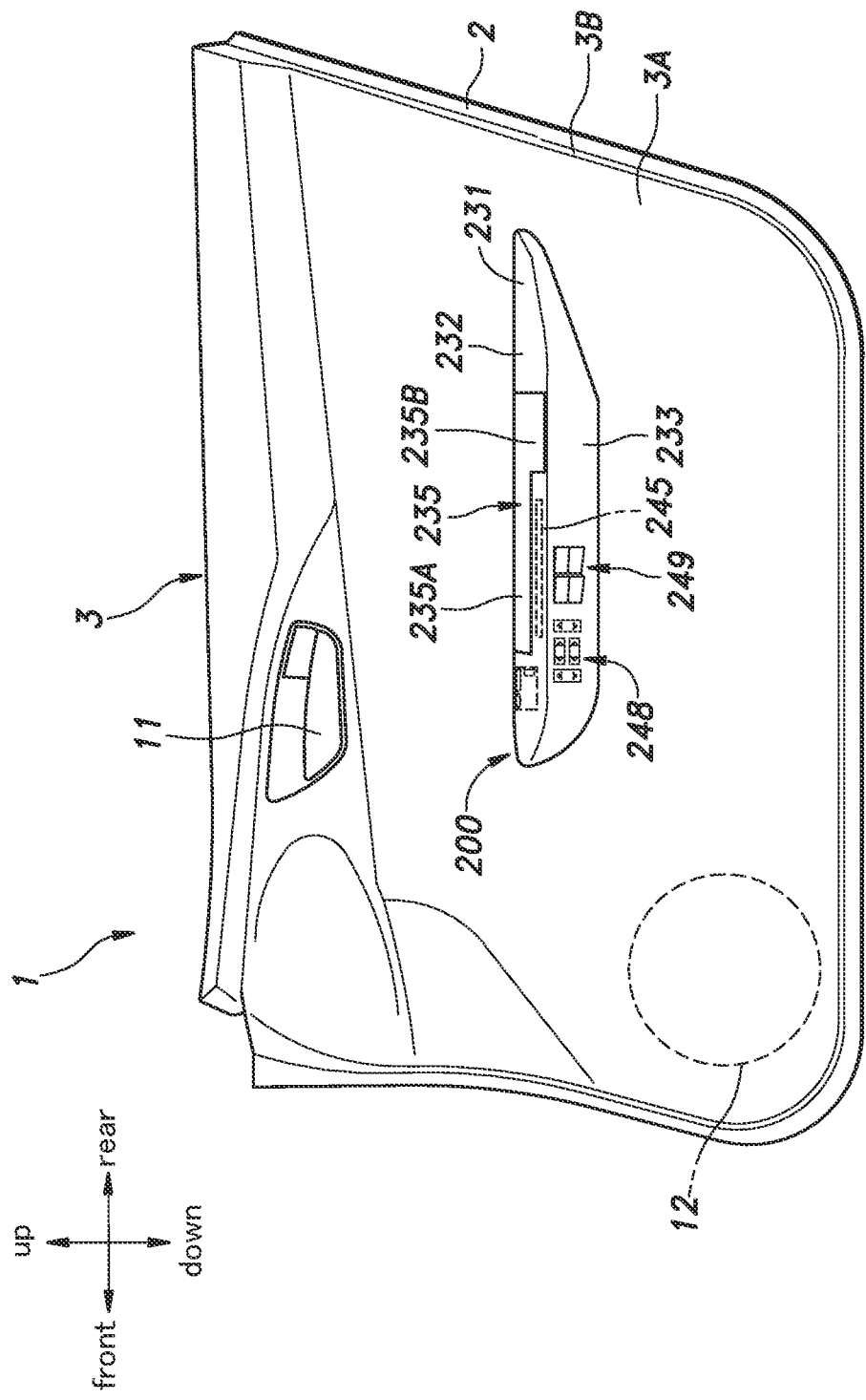

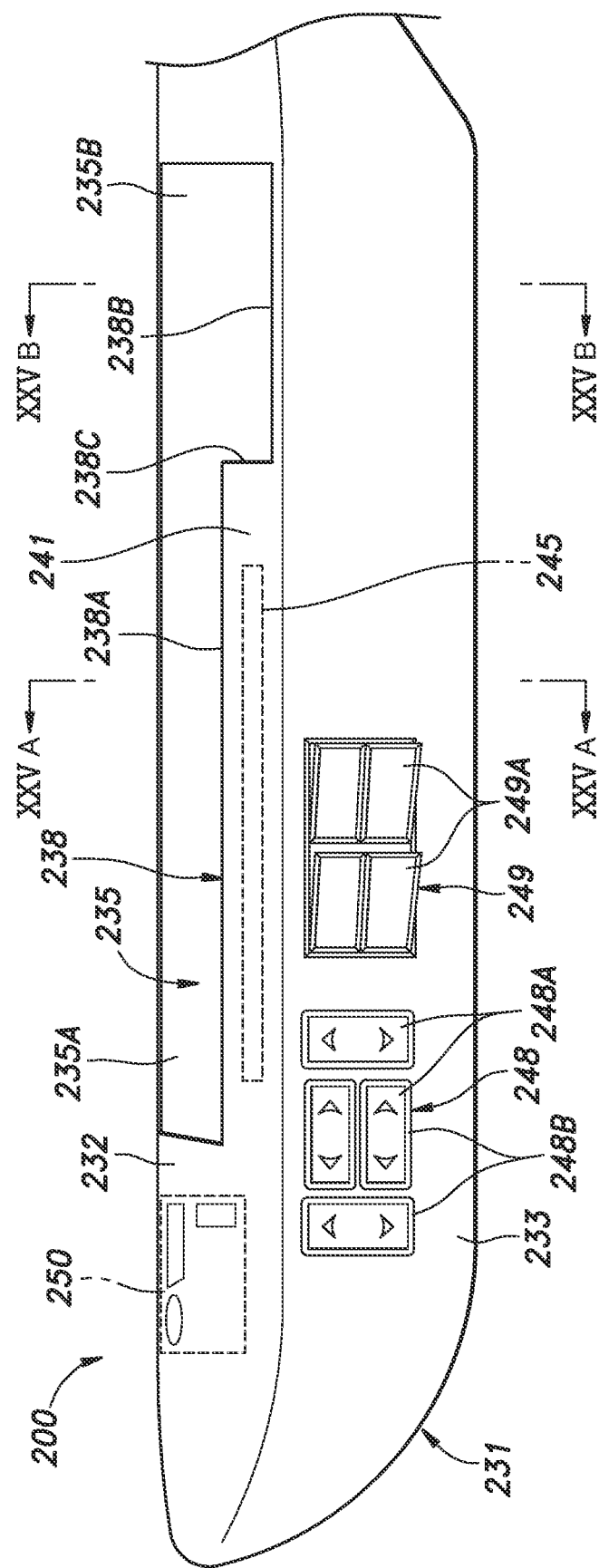

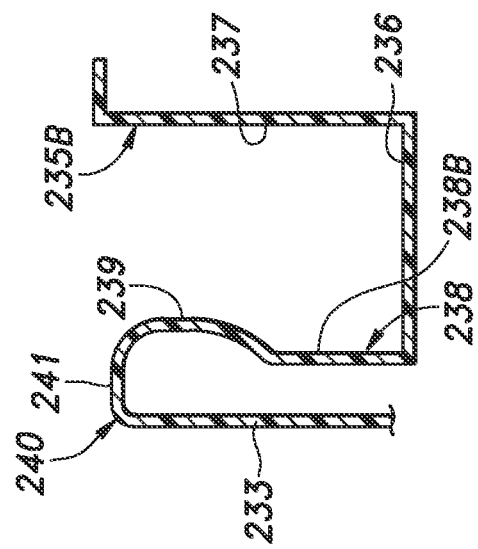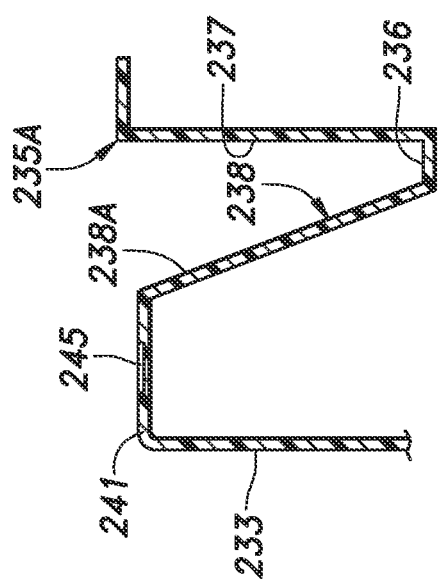

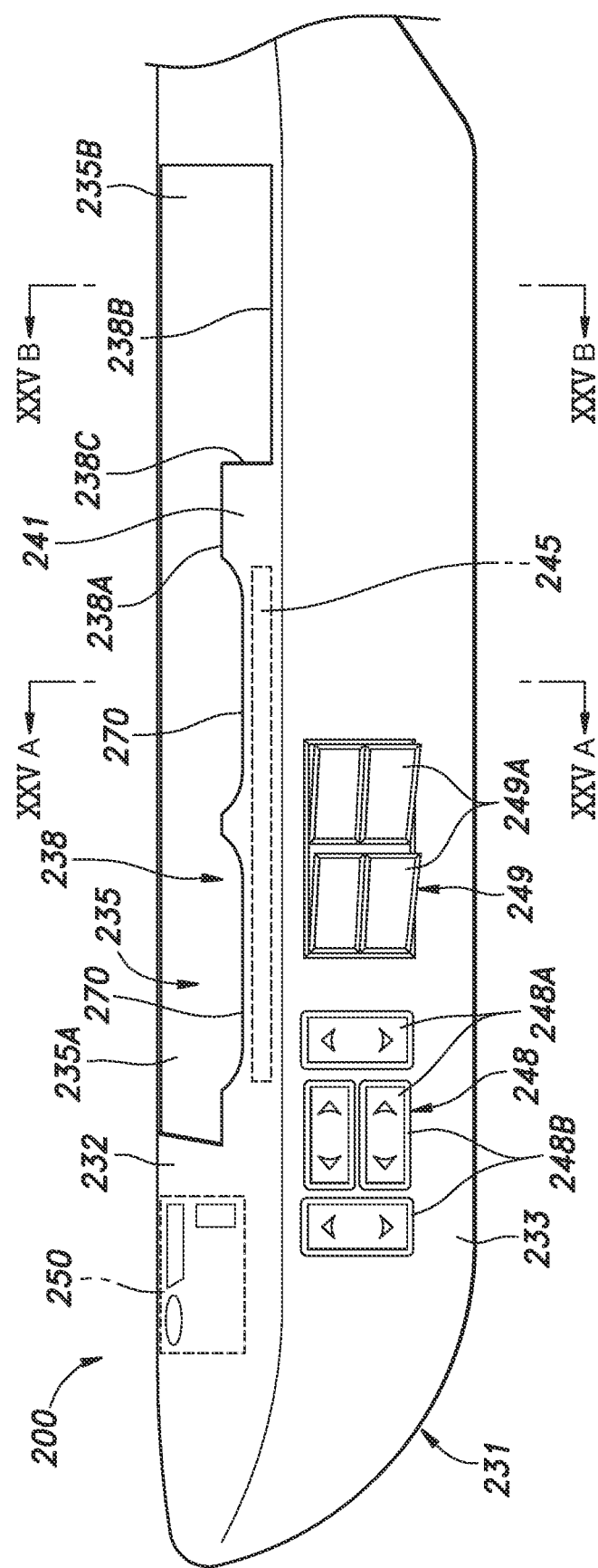

OPERATION DEVICE AND VEHICLE DOOR

CROSS REFERENCE TO RELATED APPLICATIONS

This application is the U.S. National Stage entry of International Application No. PCT/JP2020/011033 filed under the Patent Cooperation Treaty and having a filing date of Mar. 13, 2020, which claims priority to U.S. Provisional Patent Application No. 62/818,200 having a filing date of Mar. 14, 2019, Japanese Patent Application No. 2019-154106 having a filing date of Aug. 26, 2019, and Japanese Patent Application No. 2019-172943 having a filing date of Sep. 24, 2019, all of which are incorporated herein by reference.

TECHNICAL FIELD

The present invention relates to an operation device and a vehicle door.

BACKGROUND ART

Known armrests for a vehicle door include one provided with a power window switch for operating a power window up and down (See Patent Document 1, for example.) Such a vehicle door generally includes a gripper sensor installed in a pocket, the pocket forming a handle of an armrest, for detecting a finger of an occupant, and a door sensor provided on a hinge portion of the door for detecting the open/closed state of the door, thereby preventing incorrect operation. A vehicle door controller allows the power window to open or close in response an occupant's operation on the power window switch only when the gripper sensor detects a finger of the occupant and the door sensor detects the closed state of the door.

PRIOR ART DOCUMENT(S)

Patent Document(s)

Patent Document 1: JP2017-114382A

SUMMARY OF THE INVENTION

Task to be Accomplished by the Invention

However, the above-described operation device of Patent Document 1 has a problem of difficulty in configuring the device as a single independent unit because the device's door sensor needs to be provided on the hinge portion of the door. This problem leads to an increased number of work processes for assembling the device to the door.

The present invention has been made in view of the problem of the prior art, and a primary object of the present invention is to provide an operation device which can be easily installed on a vehicle door. Another object of the present invention is to provide a vehicle door comprising such an operation device.

Means to Accomplish the Task

In order to accomplish the object of the present invention, a first aspect of the present invention provides an operation device (20) for use in a vehicle, the vehicle having a front-rear direction and a cross direction, the operation device comprising: a gripper (90) provided on an inner surface of a door (1) of the vehicle, the gripper extending in the front-rear direction and including an outer side surface (33), an inner side surface (38), and an upper surface (41) which connects an upper edge of the outer side surface to that of the inner side surface; an operation interface (48) provided on the inner side surface of the gripper for receiving an operation input entered by an occupant to operate at least one in-vehicle device (21); a first sensor (45) provided on the outer side surface for detecting a finger of the occupant; a second sensor (46) provided on at least one of the inner side surface and the upper surface for detecting a finger of the occupant; and a controller (55) connected to the operation interface, the first sensor, the second sensor, and the at least one in-vehicle device, wherein the controller controls the at least one in-vehicle device based on a signal from the operation interface when both the first sensor and the second sensor detect the occupant, and wherein the controller prohibits the at least one in-vehicle device from being controlled based on a signal from the operation interface when at least one of the first sensor and the second sensor does not detect the occupant.

According to the first aspect, the operation device call be implemented as a relatively compact independent unit since the first sensor, the second sensor, and the operation interface are provided on the gripper. Therefore, the present invention can provide an operation device that can be easily installed on a door. Since the first sensor and the second sensor are provided on different surfaces of the gripper, the positions of the occupant's fingers can be recognized with relatively high accuracy based on the detection signals from the first sensor and the second sensor. As a result, the device can accurately determine whether an input to the operation interface is intentionally entered by an occupant or is made by the occupant's unintended touch.

In the first aspect, the second sensor may be provided on the outer side surface.

According to this configuration, in order to operate the operation interface, an occupant needs to hold the gripper in such a manner that both the first sensor and the second sensor can detect the occupant's fingers. As a result, when an occupant places the occupant's finger on the gripper in order to close the door, the device does not cause any in-vehicle device to operate in response to the occupant's unintentional touch to the operation interface. This can prevent the occupant's incorrect operation form occurring in a certain way.

In some cases, the first sensor and the second sensors may be disposed so as to overlap each other when viewed from the cross direction.

According to this configuration, the device can detect that an occupant grips the gripper from above based on the detection signals from the first sensor and the second sensor.

In some cases, the inner side surface may include an inclined surface (43) at an upper part thereof, the inclined surface being inclined upward and towards the outer side of the vehicle, and wherein the second sensor is provided on the inclined surface.

According to this configuration, when an occupant grips the gripper, the occupant's palm easily comes into contact with the inclined surface. As a result, the second sensor can appropriately detect that the occupant holds the gripper.

In the above configurations, the operation interface may be located below the second sensor.

This configuration allows an occupant to operate the operation interface with the first finger while holding the gripper with the palm and the second to fifth fingers.

In the above configurations, the second sensor extends in the front-rear direction, and wherein a rear end of the second sensor is located rearward of that of the operation interface.

According to these configurations, it is ensured that the second sensor detects the palm of an occupant when the occupant grips the gripper.

In some cases, the at least one in-vehicle device includes a plurality of in-vehicle devices, wherein the gripper is provided with a selection interface (52) for selecting one of the plurality of in-vehicle devices, wherein the operation interface and the selection interface are disposed to extend along the front-rear direction so as to at least partially overlap each other when viewed from the cross direction, and wherein a front end of the second sensor is located rearward of a rear end of the selection interface.

This configuration allows the operation device to operate two or more in-vehicle devices. As the operation interface and the selection interface are disposed to extend along the front-rear direction so as to at least partially overlap each other when viewed from the cross direction, an occupant can operate the operation interface and the selection interface while holding the gripper.

A second aspect of the present invention provides an operation device (100) for use in a vehicle, the vehicle having a front-rear direction and a cross direction, the operation device comprising: a handle (70) provided on an inner surface of a door (1) of the vehicle, the handle extending in the front-rear direction to have a front end and a rear end, both the front and the rear end being connected to the door; a first operation interface (111) provided on an inner side surface (105) of the handle for receiving an operation input entered by an occupant to operate at least one in-vehicle device (21); a first sensor (113) provided on an outer side surface (106) of the handle for detecting a finger of the occupant; a second sensor (114) provided on a surface (105, 17, 108) of the handle, the surface being different from the outer side surface, for detecting a finger of the occupant; and a controller (55) connected to the first operation interface, the first sensor, the second sensor, and the at least one in-vehicle device, wherein the controller controls the at least one in-vehicle device based on a signal from the first operation interface when both the first sensor and the second sensor detect the occupant, and wherein the controller prohibits the at least one in-vehicle device from being controlled based on a signal from the first operation interface when at least one of the first sensor and the second sensor does not detect the occupant.

According to the second aspect, the operation device can be implemented as a relatively compact independent unit since the first sensor, the second sensor, and the operation interface are provided on the handle. Therefore, the present invention can provide an operation device that can be easily installed on a door. Since the first sensor and the second sensor are provided on different surfaces of the handle, the positions of the occupant's fingers can be recognized with relatively high accuracy based on the detection signals from the first sensor and the second sensor. As a result, the device can accurately determine whether an input to the operation interface is intentionally entered by an occupant or is made by the occupant's unintended touch.

In the second aspect, the operation device may further comprises: a second operation interface (112) provided on the inner side surface of the handle for receiving an operation input entered by the occupant to operate at least one of the in-vehicle devices; a third sensor (115) provided on the outer side surface of the handle for detecting a finger of the occupant; and a fourth sensor (116) provided on a surface of the handle, the surface being different from the outer side surface, for detecting a finger of the occupant, wherein the second operation interface, the third sensor, and the fourth sensor are connected to the controller, and wherein the controller controls the at least one in-vehicle device based on a signal from the second operation interface when both the third sensor and the fourth sensor detect the occupant, and wherein the controller prohibits the at least one in-vehicle device from being controlled based on a signal from the second operation interface when at least one of the third sensor and the fourth sensor does not detect the occupant.

This configuration allows an occupant to operate the second operation interface when holding the handle such that both the third sensor and the fourth sensor can detect the occupant's fingers. As a result, an occupant can select the first operation interface or the second operation interface to operate by changing the positions of the fingers to hold the handle.

Preferably, the control performed by the controller based on a signal from the first operation interface is different from that based on a signal from the second operation interface.

This configuration allows an occupant to cause an in-vehicle device to perform different operations depending on whether the occupant operates on the first operation interface or the second operation interface.

In the above configurations of the second aspect, the second operation interface is located frontward of the first operation interface, wherein the third sensor is located frontward of the first sensor, and wherein the fourth sensor is located frontward of the second sensor.

According to this configuration, an occupant can select the first operation interface or the second operation interface to operate by shifting the positions of the fingers to hold the handle along the front-rear direction.

In the above configurations of the second aspect, the operation device further comprises: a first illumination device (131) around the first operation interface of the handle; and a second illumination device (141) around the second operation interface of the handle, wherein the first illumination device and the second illumination device are connected to the controller, wherein the controller causes the first illumination device to emit light when both the first sensor and the second sensor detect the occupant, and wherein the controller causes the second illumination device to emit light when both the third sensor and the fourth sensor detect the occupant.

According to this configuration, an occupant can recognize which operation interface can be operated.

A third aspect of the present invention provides a vehicle door comprising the operation device having any one of the above-described configurations.

According to the third aspect, the present invention can provide a door comprising an operation device which can be easily installed to the door.

Effect of the Invention

A first aspect of the present invention provides an operation device (20) for use in a vehicle, the vehicle having a front-rear direction and a cross direction, the operation device comprising: a gripper (90) provided on an inner surface of a door (1) of the vehicle, the gripper extending in the front-rear direction and including an outer side surface (33), an inner side surface (38), and an upper surface (41) which connects an upper edge of the outer side surface to that of the inner side surface; an operation interface (48) provided on the inner side surface of the gripper for receiving an operation input entered by an occupant to operate at least one in-vehicle device (21); a first sensor (45) provided on the outer side surface for detecting a finger of the occupant; a second sensor (46) provided on at least one of the inner side surface and the upper surface for detecting a finger of the occupant; and a controller (20) connected to the operation interface, the first sensor, the second sensor, and the at least one in-vehicle device, wherein the controller controls the at least one in-vehicle device based on a signal from the operation interface when both the first sensor and the second sensor detect the occupant, and wherein the controller prohibits the at least one in-vehicle device from being controlled based on a signal from the operation interface when at least one of the first sensor and the second sensor does not detect the occupant. According to this configuration, in order to operate the operation interface, an occupant needs to hold the gripper in such a manner that both the first sensor and the second sensor can detect the occupant's fingers. As a result, when an occupant places the occupant's finger on the gripper in order to close the door, the device does not cause any in-vehicle device to operate in response to the occupant's unintentional touch to the operation interface. This can prevent the occupant's incorrect operation form occurring in a certain way.

In some cases, the first sensor and the second sensors may be disposed so as to overlap each other when viewed from the cross direction. According to this configuration, the device can detect that an occupant grips the gripper from above based on the detection signals from the first sensor and the second sensor.

In some cases, the inner side surface may include an inclined surface (43) at an upper part thereof, the inclined surface being inclined upward and towards the outer side of the vehicle, and wherein the second sensor is provided on the inclined surface. According to this configuration, when an occupant grips the gripper, the occupant's palm easily comes into contact with the inclined surface. As a result, the second sensor can appropriately detect that the occupant holds the gripper.

In the above configurations, the operation interface may be located below the second sensor. This configuration allows an occupant to operate the operation interface with the first finger while holding the gripper with the palm and the second to fifth fingers.

In the above configurations, the second sensor extends in the front-rear direction, and wherein a rear end of the second sensor is located rearward of that of the operation interface. According to these configurations, it is ensured that the second sensor detects the palm of an occupant when the occupant grips the gripper.

In some cases, the at least one in-vehicle device includes a plurality of in-vehicle devices, wherein the gripper is provided with a selection interface (52) for selecting one of the plurality of in-vehicle devices, wherein the operation interface and the selection interface are disposed to extend along the front-rear direction so as to at least partially overlap each other when viewed from the cross direction, and wherein a front end of the second sensor is located rearward of a rear end of the selection interface. This configuration allows the operation device to operate two or more in-vehicle devices. As the operation interface and the selection interface are disposed to extend along the front-rear direction so as to at least partially overlap each other when viewed from the cross direction, an occurs can operate the operation interface and the selection interface while holding the gripper.

A second aspect of the present invention provides an operation device (100) for use in a vehicle, the vehicle having a front-rear direction and a cross direction, the operation device comprising: a handle (70) provided on an inner surface of a door (1) of the vehicle, the handle extending in the front-rear direction to have a front end and a rear end, both the front and the rear end being connected to the door; a first operation interface (111) provided on an inner side surface (105) of the handle for receiving an operation input entered by an occupant to operate at least one in-vehicle device (21); a first sensor (113) provided on an outer side surface (106) of the handle for detecting a finger of the occupant; a second sensor (114) provided on a surface (105, 17, 108) of the handle, the surface being different from the outer side surface, for detecting a finger of the occupant; and a controller (55) connected to the first operation interface, the first sensor, the second sensor, and the at least one in-vehicle device, wherein the controller controls the at least one in-vehicle device based on a signal from the first operation interface when both the first sensor and the second sensor detect the occupant, and wherein the controller prohibits the at least one in-vehicle device from being controlled based on a signal from the first operation interface when at least one of the first sensor and the second sensor does not detect the occupant. According to the second aspect, the operation device can be implemented as a relatively compact independent unit since the first sensor, the second sensor, and the operation interface are provided on the handle. Therefore, the present invention can provide an operation device that can be easily installed on a door. Since the first sensor and the second sensor are provided on different surfaces of the handle, the positions of the occupant's fingers can be recognized with relatively high accuracy based on the detection signals from the first sensor and the second sensor. As a result, the device can accurately determine whether an input to the operation interface is intentionally entered by an occupant or is made by the occupant's unintended touch.

In the second aspect, the operation device may further comprises: a second operation interface (112) provided on the inner side surface of the handle for receiving an operation input entered by the occupant to operate the at least one of the in-vehicle devices; a third sensor (115) provided on the outer side surface of the handle for detecting a finger of the occupant; and a fourth sensor (116) provided on a surface of the handle, the surface being different from the outer side surface, for detecting a finger of the occupant, wherein the second operation interface, the third sensor, and the fourth sensor are connected to the controller, and wherein the controller controls the at least one in-vehicle device based on a signal from the second operation interface when both the third sensor and the fourth sensor detect the occupant, and wherein the controller prohibits the at least one in-vehicle device from being controlled based on a signal from the second operation interface when at least one of the third sensor and the fourth sensor does not detect the occupant. This configuration allows an occupant to operate the second operation interface when holding the handle such that both the third sensor and the fourth sensor can detect the occupant's fingers. As a result, an occupant can select the first operation interface or the second operation interface to operate by changing the positions of the fingers to hold the handle.

Preferably, the control performed by the controller based on a signal from the first operation interface is different from that based on a signal from the second operation interface. This configuration allows an occupant to cause an in-vehicle device to perform different operations depending on whether the occupant operates on the first operation interface or the second operation interface.

In the above configurations of the second aspect, the second operation interface is located frontward of the first operation interface, wherein the third sensor is located frontward of the first sensor, and wherein the fourth sensor is located frontward of the second sensor. According to this configuration, an occupant can select the first operation interface or the second operation interface to operate by shifting the positions of the fingers to hold the handle along the front-rear direction.

In the above configurations of the second aspect, the operation device further comprises: a first illumination device (131) around the first operation interface of the handle; and a second illumination device (141) around the second operation interface of the handle, wherein the first illumination device and the second illumination device are connected to the controller, wherein the controller causes the first illumination device to emit light when both the first sensor and the second sensor detect the occupant, and wherein the controller causes the second illumination device to emit light when both the third sensor and the fourth sensor detect the occupant. According to this configuration, aft occupant can recognize which operation interface can be operated.

A third aspect of the present invention provides a vehicle door comprising the operation device having any one of the above-described configurations. the present invention can provide a door comprising an operation device which can be easily installed to the door.

BRIEF DESCRIPTION OF THE DRAWINGS

FIG. 4 is a cross-sectional view taken along line IV-IV in FIG. 2;

FIG. 22 is a cross-sectional view showing an inner side surface of a handle according to a variation of the sixth embodiment;

FIG. 23 is a side view of a vehicle door according to a seventh embodiment of the present invention;

FIG. 24 is a perspective view of the operation device according to the seventh embodiment;

FIGS. 25A and 25B are cross-sectional views of the operation device taken along line XXVA-XXVA and line XXVB-XXVB of FIG. 24, respectively;

FIG. 27 is a perspective view of the operating device according to the variant of the seventh embodiment.

DESCRIPTION OF THE PREFERRED EMBODIMENT(S)

An operation device and a vehicle door comprising the operation device according to preferred embodiments of the present invention will be described with reference to the appended drawings.

Figure 1:
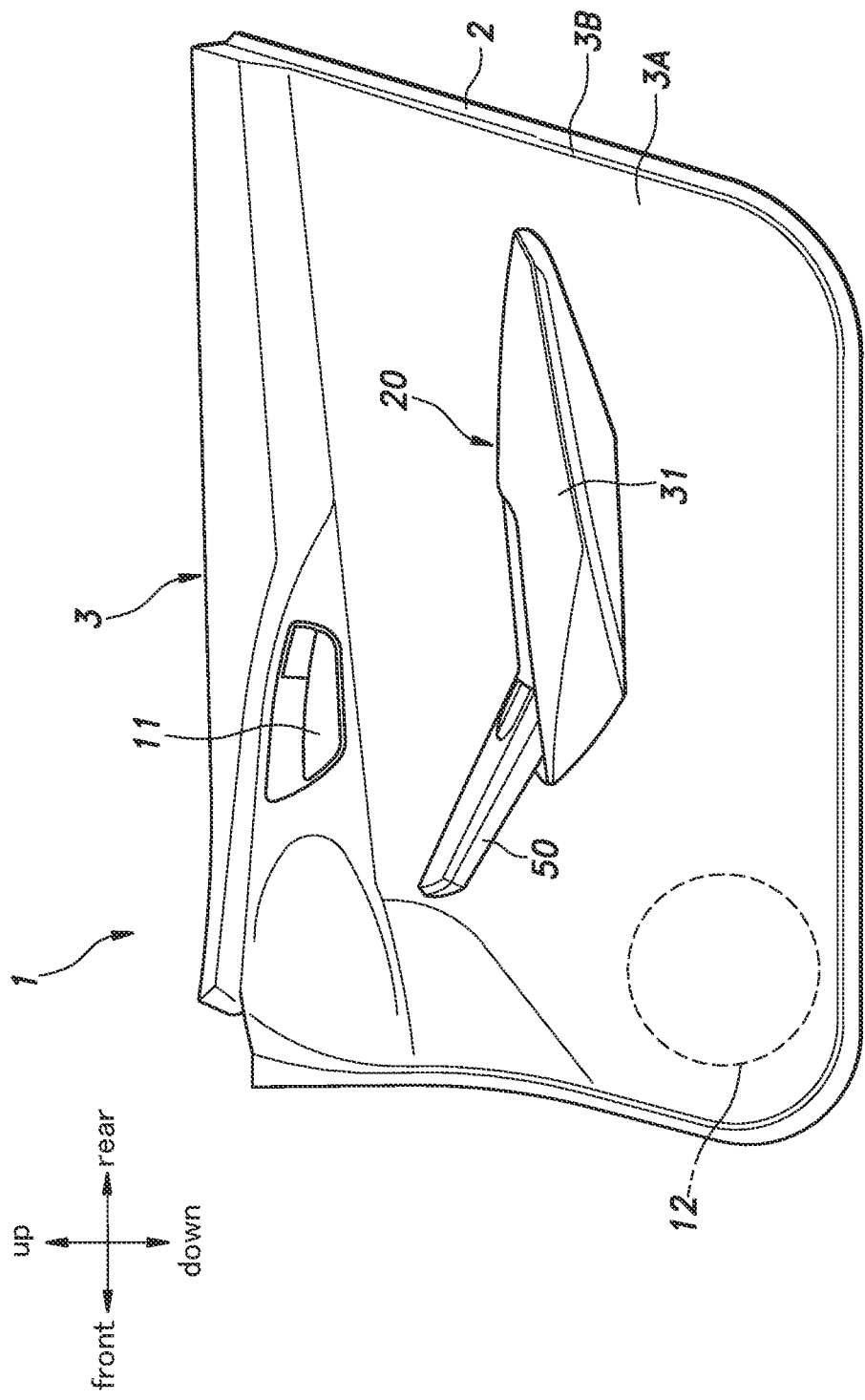
FIG. 1 is a side view of a vehicle door according to a first embodiment of the present invention.

As shown in FIG. 1, a vehicle door 1 according to a first embodiment of the present invention includes a door panel 2 provided as a door frame member, and a door trim 3 configured to cover the interior side surface of the door panel 2. The door panel 2 includes an inner panel and an outer panel both formed of a steel plate. The inner panel and the outer panel are connected to each other at their front edges, lower edges, and rear edges, with no connection at their upper edges, to define a center space therebetween.

The door trim 3 is formed of a plastic material. The door trim 3 includes a trim body 3A which is generally flat and can be provided on the interior side of the door panel 2, and a trim edge wall 3B projecting from the peripheral edge of the trim body 3A such that, when the door trim 3 is provided on the door panel 2, the trim edge wall 3B abuts on the peripheral edge of the interior side surface of the door panel 2. The trim edge wall 3B extends along the peripheral edge of the trim body 3A.

A door handle 11 used for opening and closing the vehicle door is provided at the upper portion of the trim body 3A. A speaker 12 may be provided at the lower front portion of the trim body 3A. Furthermore, a pocket, which extends out into the interior of the vehicle, may be provided rearward of the speaker 12 on the lower portion of the trim body 3A.

Figure 2:
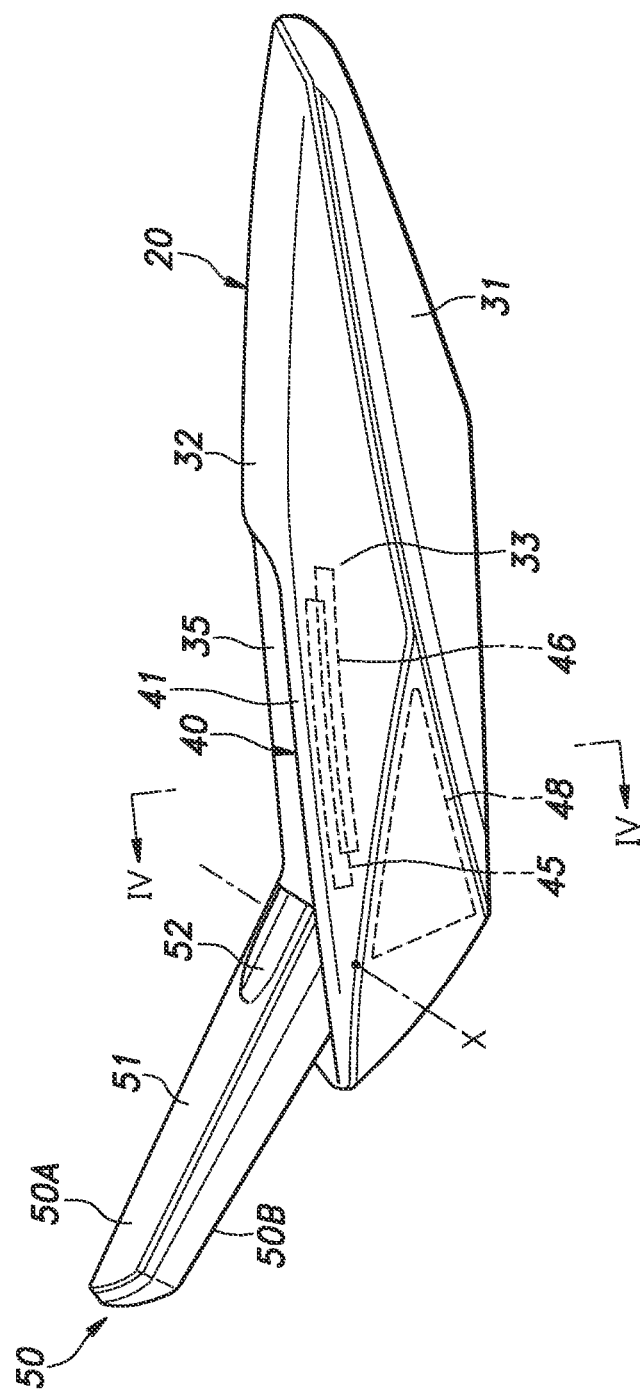
FIG. 2 is a perspective view of an operation device.
Figure 3:
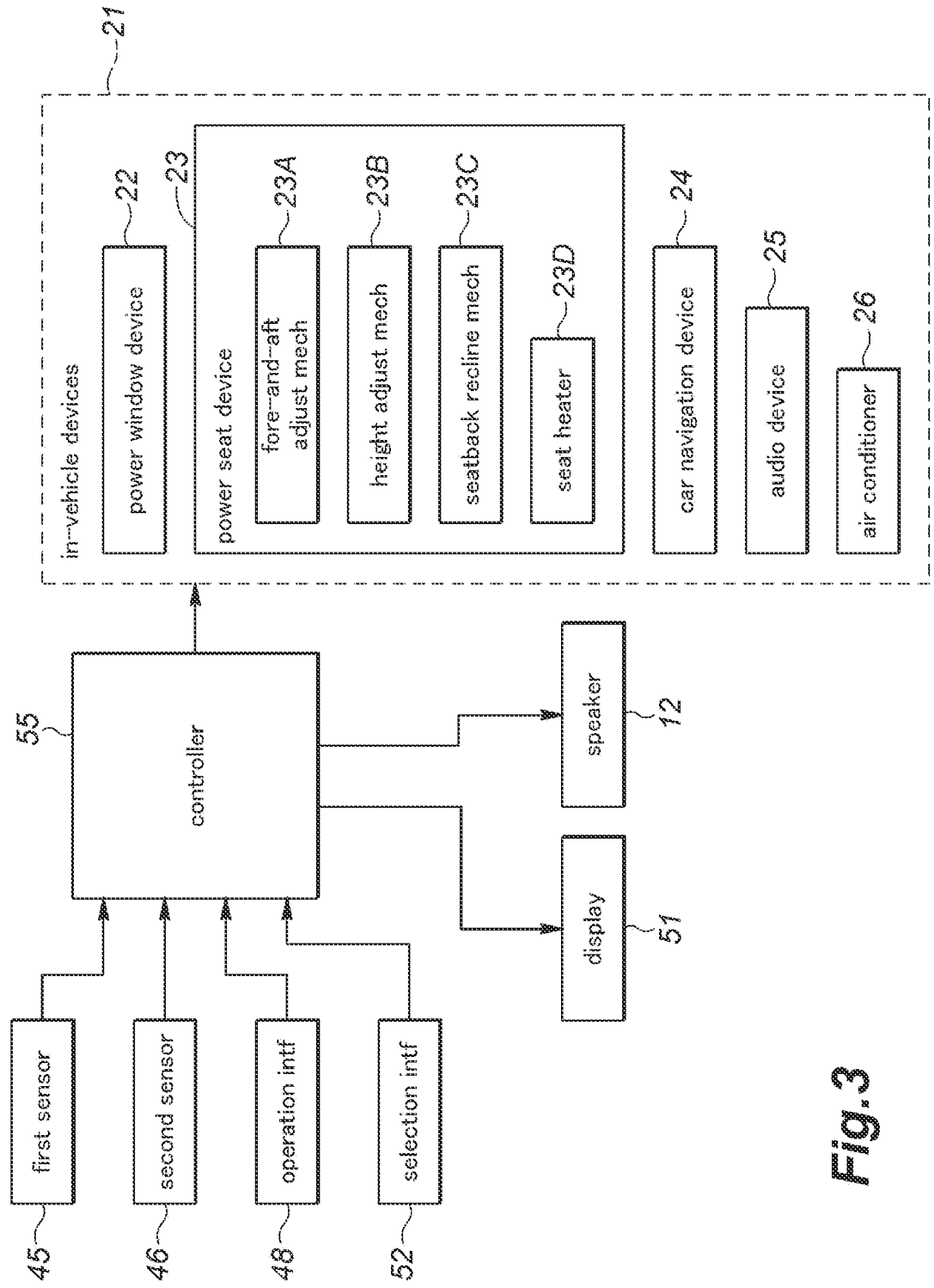
FIG. 3 is a block diagram showing an operation device, in-vehicle devices, and a display.

As shown in FIGS. 1 and 2, an operation device 20 is provided at a vertically middle portion of the interior side surface of the trim body 3A. The operation device 20 is a device for receiving an occupant's input to operate one or more in-vehicle devices 21. As shown in FIG. 3, examples of the in-vehicle devices 21 include a power window device 22, a power seat device 23, a car navigation device 24, an audio device 25, an air conditioner 26.

The power seat device 23 may include a fore-and-aft adjustment mechanism 23A for moving the seat in the front-rear direction with respect to the vehicle body, a height adjustment mechanism 23B for changing the height of the seat with respect to the vehicle body, a seatback reclining mechanism 23C for changing the angle of the seatback with respect to the seat, and/or a seat heater 24D provided in the seat for changing the temperature of the seat. Each of the fore-and-aft adjustment mechanism 23A, the height adjustment mechanism 23B, and the seatback reclining mechanism 23C includes an electric motor for driving the mechanism. The seat heater 24D includes a heating wire and changes the temperature according to the supplied electric current.

As shown in FIG. 2, the operation device 20 includes a main body 31, which is an outer shell of the device. The main body 31 is formed of a plastic material. The main body 31 is attached to a vertically middle portion of the interior side surface of the trim body 3A and extends in the front-rear direction. The main body 31 may be connected to the trim body 3A by screws or any other coupling means. Alternatively, the main body 31 may be integrally formed with the trim body 3A.

The main body 31 of the operation device 20 has a main body upper surface 32 at the upper portion of the main body and a main body side surface 33 at the interior side end of the main body, where the main body upper surface 32 faces upward and extends inward with respect to the trim body 3A, and the main body side surface 33 faces towards the interior of the vehicle. The main body upper surface 32 can support a forearm of an occupant, and thus can be used as an armrest.

As shown in FIGS. 2 and 4, a recess 35 (pocket) is formed on the upper surface of the main body 31 of the operation device 20. The recess 35 is formed in a substantially rectangular parallelepiped shape and extends in the front-rear direction. The recess 35 is defined by a recess bottom wall 36 and recess side walls 37 (or a tubular recess side wall) extending upward from the recess bottom wall 36. A first side surface 38 is an inner surface of the interior side part of the recess side wall 37, the first side surface 38 facing outward along the cross direction of the vehicle. The first side surface 38 extends substantially vertically. A protruding part 39 extends outward along the cross direction of the vehicle at the upper end portion of the interior side part of the recess side wall 37 corresponding to the first side surface 38, in the main body upper surface 32, a first upper surface 41 is a surface extending between the upper end of the main body side surface 33 and the recess 35, i.e., the upper end of the first side surface 38. The first upper surface 41 connects the upper end of the first side surface 38 to that of the main body side surface 33. A gripper 40 is formed by the first side surface 38, the first upper surface 41, and the main body side surface 33. The gripper 40 is a wall portion protruding upward and extending in the front-rear direction such that an occupant can grip/hold the gripper 40 with the occupant's fingers. The occupant can hold the gripper 40 in order to open or close the vehicle door 1.

An inclined surface 43 extends at the upper end portion of the main body side surface 33 such that the inclined surface 43 is inclined to extend upward and outward along the cross direction of the vehicle. Preferably, the upper end of the inclined surface 43 is smoothly connected to the first upper surface 41. The inclined surface 43 is not an essential feature and may be omitted in some embodiments. The inclined surface 43 may be provided to minimize the width of the first upper surface 41 in the cross direction.

A first sensor 45 for detecting a finger(s) of an occupant is provided in the first side surface 38 (the side of the gripper 40 facing the inner space of the recess). A second sensor 46 for detecting a finger(s) of the occupant is provided in the main body side surface 33 (the side of the gripper 40 facing the interior of the vehicle). The first sensor 45 and the second sensor 46 are sensors configured to detect the contact or approach of a finger of an occupant, and examples of sensors that can be used as the first sensor 45 and the second sensor 46 include a capacitance sensor, a piezoelectric sensor, a membrane switch, and an infrared beam switch.

The first sensor 45 extends in the front-rear direction on the first side surface 38. The first sensor 45 is preferably provided at the upper end portion of the first side surface 38. In the present embodiment, the first sensor 45 is provided in the protruding part 39. The first sensor 45 may be embedded in the first side surface 38 so that a surface of the first sensor 45 is flush with the first side surface 38.

The second sensor 46 extends in the front-rear direction on the main body side surface 33. The second sensor 46 is preferably provided at the upper end portion of the main body side surface 33. In the present embodiment, the second sensor 46 is provided on the inclined surface 43. The second sensor 46 may be embedded in the main body side surface 33 so that a surface of the second sensor 46 is flush with the main body side surface 33. The first sensor 45 and the second sensor 46 are arranged so as to overlap each other when viewed from the cross direction of the vehicle. In other words, the first sensor 45 and the second sensor 46 are located at the vertically same position. The first sensor 45 and the second sensor 46 are arranged in the recess side and the interior side of the upper end portion of the gripper 40, respectively. The main surface of the first sensor 45 and that of the second sensor 46 may be not parallel with each other.

The rear end of the second sensor 46 is located frontward of the rear end of the gripper 40 (the rear end of the first side surface 38). Furthermore, the front end of the second sensor 46 is located rearward of the front end of the gripper 40 (the front end of the first side surface 38).

As shown in FIG. 2, an operation interface 48 is provided on the main body side surface 33 (the interior side of the gripper 40). The operation interface 48 is configured to receive an occupant's input to operate at least one in-vehicle device 21. The operation interface 48 is a switch to be operated by an occupant's finger, and examples of the operation interface 48 include a capacitance sensor, a piezoelectric sensor, and a membrane switch. In the present embodiment, the operation interface 48 is a capacitive touch panel, and receives a swipe operation and a touch operation performed thereon by the occupant's finger.

Figure 7:
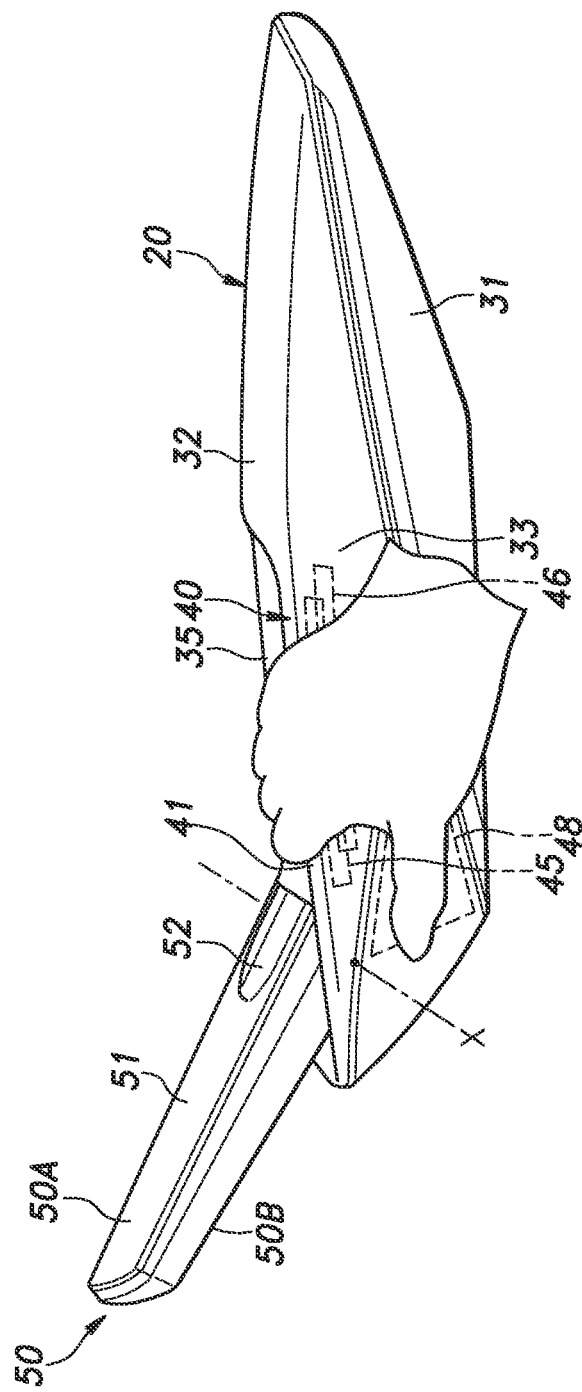
FIG. 7 is an explanatory view showing the positions of the occupant's fingers when the occupant operates the operation interface.

The operation interface 48 is located below the second sensor 46 on the main body side surface 33. Furthermore, the rear end of the second sensor 46 is located rearward of the rear end of the operation interface 48. The front end of the operation interface 48 is located frontward of the front end of the second sensor 46. Preferably, as shown in FIG. 7, the operation interface 48 is located such that an occupant can operate it with the occupant's first finger while holding the gripper 40 with the occupant's palm and the second to fifth fingers.

Figure 5A:
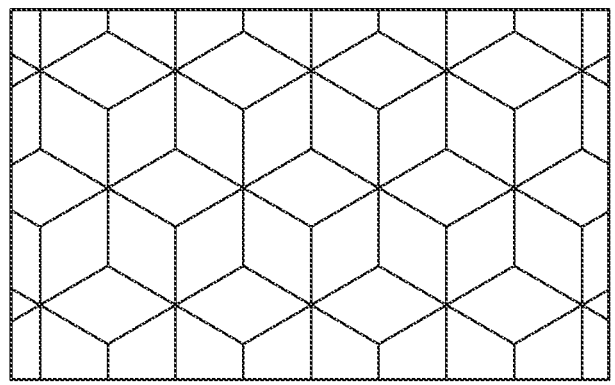
FIGS. 5A and 5B are explanatory views showing examples of surface shapes of the operation interface.
Figure 5B:
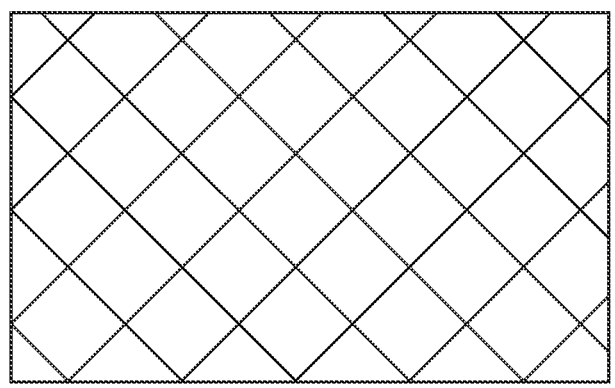

Preferably, the operation interface 48 is embedded in the main body side surface 33 so that the surface of the operation interface 48 is flush with the main body side surface 33. The surface of the operation interface 48 preferably has a surface shape different from that of the main body side surface 33. The surface of the operation interface 48 is preferably a patterned indented surface, for example. The patterned indented surface may includes polygonal planes regularly arranged, for example, as shown in FIGS. 5A and 5B. Although the examples shown in the figures only include quadrangular patterns, the patterned indented surface may include other polygonal patterns such as triangle and pentagon patterns.

As shown in FIG. 2, an upper plate 50 is provided at the front end of the main body 31 of the operation device 20. The upper plate 50 is a plate-shaped member extending from its base end to its free end, and has a top surface 50A and a back surface 50B. The base end of the upper plate 50 is rotatably supported by the front end of the main body 31 so that the upper plate 50 is rotatable about a rotation axis X extending in the cross direction. In the present embodiment, the base end of the upper plate 50 is arranged within the recess 35 and is supported by the left and right recess side walls 37.

Figure 6:
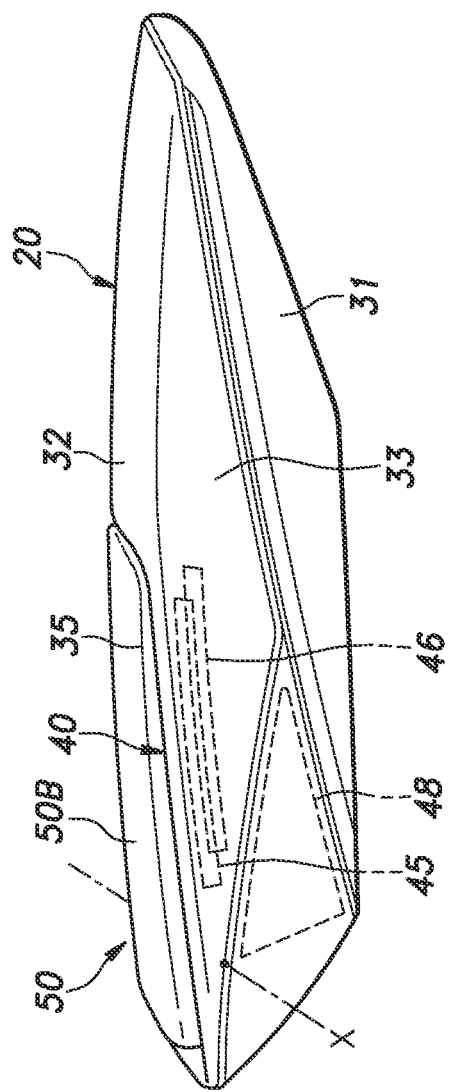
FIG. 6 is a perspective view of the operation device when the upper plate is in the accommodated position.

The upper plate 50 rotationally moves between a usable position (FIG. 2) and an accommodated position (FIG. 6). When the upper plate 50 is in the usable position, the free end is located frontward of and above the base end, and the top surface 50A is located above the back surface 50B. When the upper plate 50 is in the accommodated position, the free end is located rearward of the base end and the top surface 50A is located below the back surface 50B. In the accommodated position, the upper plate 50 closes the open end of the recess 35. Iii other words, the upper plate 50 serves as a lid for closing the recess 35.

An urging member (not shown) is provided between the upper plate 50 and the main body 31. The urging member may comprise a spring. When the upper plate 50 is located between the usable position and a middle position between the usable position and the accommodated position, the urging member urges the upper plate 50 to the usable position. When the upper plate 50 is located between the middle position and the accommodated position, the urging member urges the upper plate 50 to the accommodated position.

As shown in FIG. 2, a display 51 and a selection interface 52 are provided on the top surface 50A of the upper plate 50. The display 51 is, for example, a liquid crystal display or an organic EL display. The selection interface 52 is configured to receive an occupant's input to operate at least one in-vehicle device 21. The operation interface 48 is a switch to be operated by an occupant's finger, and examples of the operation interface 48 include a capacitance sensor, a piezoelectric sensor, and a membrane switch. In the present embodiment, the selection interface 52 is a capacitive touch panel, and receives a swipe operation and a touch operation performed thereon by the occupant's finger. Furthermore, the selection interface 52 may be integrally formed with the display 51. In some embodiments, the display 51 is a touch panel display, and a part of the display 51 may form the selection interface 52. The selection interface 52 is provided at a location on the base end side on the top surface 50A of the upper plate 50. The display 51 is provided at location on the free end side of the selection interface 52 on the top surface 50A of the upper plate 50.

Figure 8:
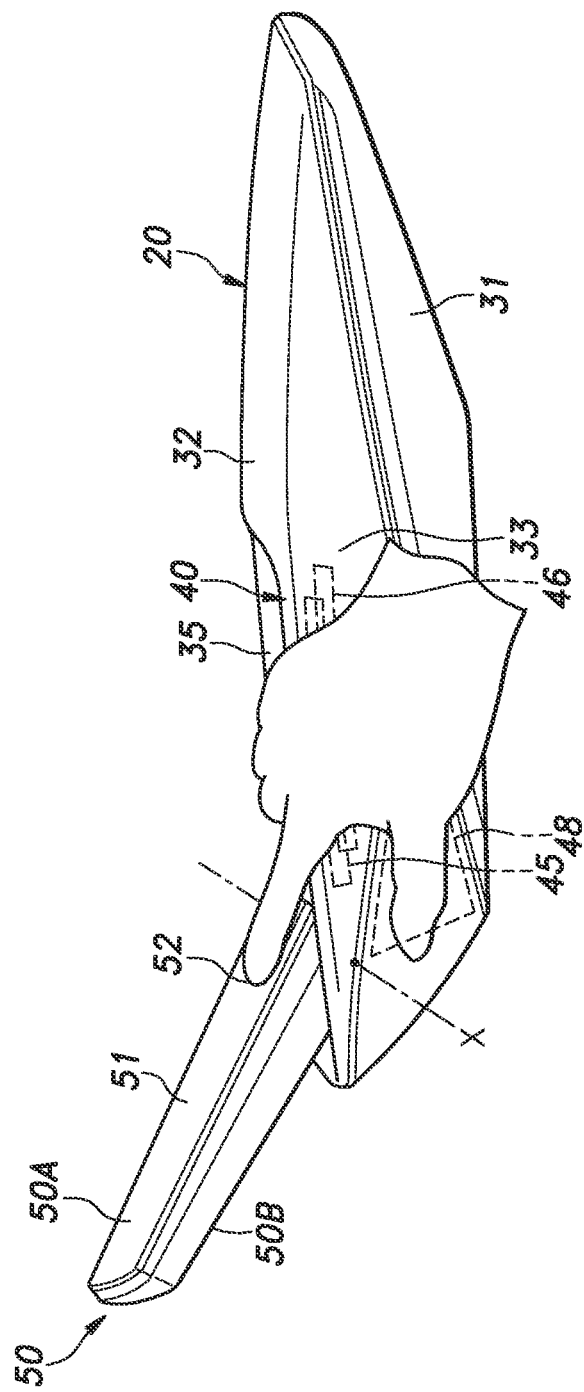
FIG. 8 is an explanatory view showing the positions of the occupant's fingers when the occupant operates the selection interface.

The selection interface 52 and the operation interface 48 are provided on different surfaces of the operation device. The operation interface 48 and the selection interface 52 are disposed to extend along the front-rear direction so as to at least partially overlap each other when viewed from a vehicle cross direction. The selection interface 52 is located frontward of the gripper 40. The front end of the second sensor 46 is located rearward of the rear end of the selection interface 52. Preferably, as shown in FIG. 8, the selection interface 52 is located such that an occupant can operate it with the occupant's second finger (index finger) while holding the gripper 40 with the occupant's palm and the third to fifth fingers. Preferably, the selection interface 52 is inclined downward and towards the base end when in use.

The first sensor 45, the second sensor 46, the operation interface 48, the selection interface 52, the display 51, and the at least one in-vehicle device 21 are connected to a controller 55. The controller 55 is an electronic controller including a processing device such as a CPU. In the present embodiment, the controller 55 is disposed inside the main body 31. In other embodiments, the controller 55 may be provided between the door panel 2 and the door trim 3, or provided on the vehicle body.

The controller 55 is configured to select one in-vehicle device 21 to be operated based on a signal from the selection interface 52, and also select one or more in-vehicle devices 21 to be displayed on the display 51. In some embodiments, the controller 55 detects a swipe operation; i.e. a swipe to the left or right on the interface, based on a signal from the selection interface 52 and changes the in-vehicle device 21 to be operated according to that swipe operation. The controller 55 displays a device operation-status image for the selected in-vehicle device 21 on the display 51. The device operation-status image may include, for example, an icon or character for the selected in-vehicle device 21, and symbols or marks showing how the selected in-vehicle device 21 can be operated (such as marks indicating the movement directions of the in-vehicle device). For example, when the selected in-vehicle device 21 is the fore-and-aft adjustment mechanism 23A of the power seat device 23, the device operation-status image may include an icon of the fore-and-aft adjustment mechanism 23A and arrows indicating the front-rear direction. In some embodiments, when a plurality of in-vehicle devices 21 of the same type are provided, the controller 55 may be used to select one of the same type in-vehicle devices 21. For example, when the respective power seat devices 23 are provided for the front right seat and the front left seat, the controller 55 may be configured to select one of the power seat device for the front right seat and that for the front left seat, and to independently control the selected power seat device 23.

The controller 55 detects whether or not an occupant's finger is in contact with the first sensor 45 or whether or not the finger is present close to the first sensor 45, based on a signal from the first sensor 45. The controller 55 also detects whether an occupant's finger is in contact with the second sensor 46 or whether the finger is present close to the second sensor 46, based on a signal from the second sensor 46. When both the first sensor 45 and the second sensor 46 detect an occupant (fingers of an occupant), the controller 55 controls the selected in-vehicle device 21 based on a signal from the operation interface 48. Specifically, when a finger of the occupant is detected based on a signal from the first sensor 45 and also a finger of the occupant is detected based on a signal from the second sensor 46, the controller 55 is controls a selected one of the in-vehicle devices 21 based on a signal from the operation interface 48. When at least one of the first sensor 45 and the second sensor 46 does not detect the occupant, the controller 55 prohibits the in-vehicle devices 21 from being controlled based on a signal from the operation interface 48. Specifically, when no occupant's finger is detected based on a signal from the first sensor 45 and/or no occupant's finger is detected based on a signal from the second sensor 46, the controller 55 prohibits the in-vehicle devices 21 from being controlled based on a signal from the operation interface 48.

As shown in FIG. 7, in the present embodiment, the operation interface 48 receives a swipe operation for each of the directions including the upward, downward, frontward, and backward directions. The controller 55 detects the direction and the stroke length of each swipe operation based on a signal from the operation interface 48. The controller 55 controls the selected in-vehicle device 21 based on a signal for the detected direction and stroke length of a swipe operation performed on the operation interface 48.

For example, in the case where the fore-and-aft adjustment mechanism 23A of the power seat device 23 for the front right seat is selected, when detecting a swipe operation for the frontward direction based on a signal from the operation interface 48, the controller 55 controls the fore-and-all adjustment mechanism 23A of the power seat device 23 so as to move the seat frontward. The controller 55 may determine the amount of frontward movement of the seat caused by the power seat device 23 based on the stroke length of a swipe operation.

Moreover, in the case where the height adjustment mechanism 23B of the power seat device 23 for the front left seat is selected, when detecting a swipe operation for the upward direction based on a signal from the operation interface 48, the controller 55 controls the height adjustment mechanism 23B of the power seat device 23 so as to raise the seat higher. The controller 55 may determine the amount of upward movement of the seat caused by the power seat device 23 based on the stroke length of a swipe operation.

Choosing what input operation is performed on the operation interface 48 for each control and how each in-vehicle device 21 is controlled is a matter w a designer of the device can decide upon as appropriate.

When controlling an in-vehicle device 21 based on an occupant's operation on the operation interface 48, the controller 55 preferably displays an image on the display 51 to indicate that the selected in-vehicle device 21 is being controlled. For example, when controlling the fore-and-aft adjustment mechanism 23A of the power seat device 23 so as to move the seat frontward, the controller 55 may show on the display 51 an image and/or text information indicating that the seat is moving frontward. In some cases, when controlling an in-vehicle device 21 based on an occupant's operation on the operation interface 48, the controller 55 may output a sound from the speaker 12 to indicate that the selected in-vehicle device 21 is being controlled. Preferably, different images and or sounds are used for different in-vehicle devices 21 to notify an occupant of which device is being controlled. This allows an occupant to easily recognize in-vehicle device 21 is being controlled.

In the operation device 20 according to the present embodiment, since the gripper 40 includes the first sensor 45, the second sensor 46, and the operation interface 48, the operation device 20 can be made to be a separate unit having a relatively small size. Thus, the present invention can provide an operation device 20 that can be easily attached to the vehicle door 1. Since the first sensor 45 and the second sensor 46 are provided on respective different surfaces of the gripper 40, the operation device can grasp the positions of the occupant's fingers with relatively high accuracy based on detection signals from the first sensor 45 and the second sensor 46. As such, the operation device can accurately determine whether an input to the operation interface 48 is intentionally entered by an occupant or is made by the occupant's unintended touch.

Figure 9:
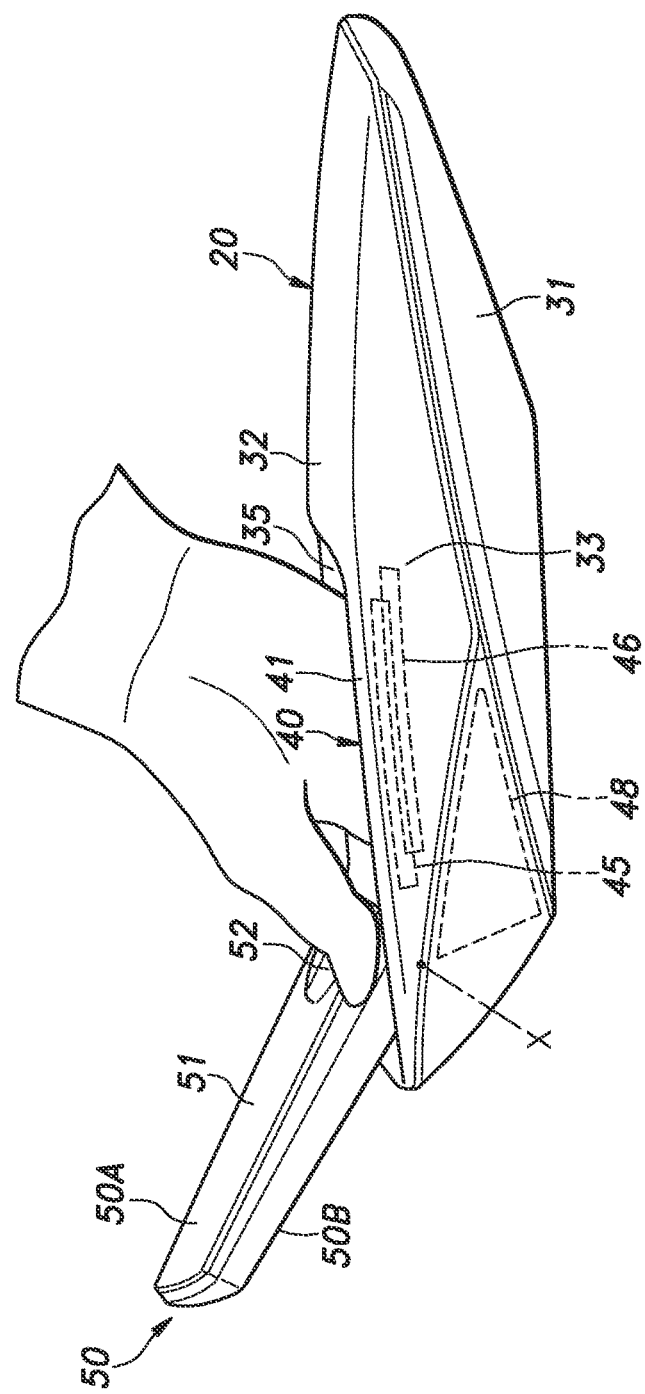
FIG. 9 is an explanatory view showing the positions of the occupant's fingers when the occupant holds the fingers on a recess in order to open or close the vehicle door.
Figure 10:
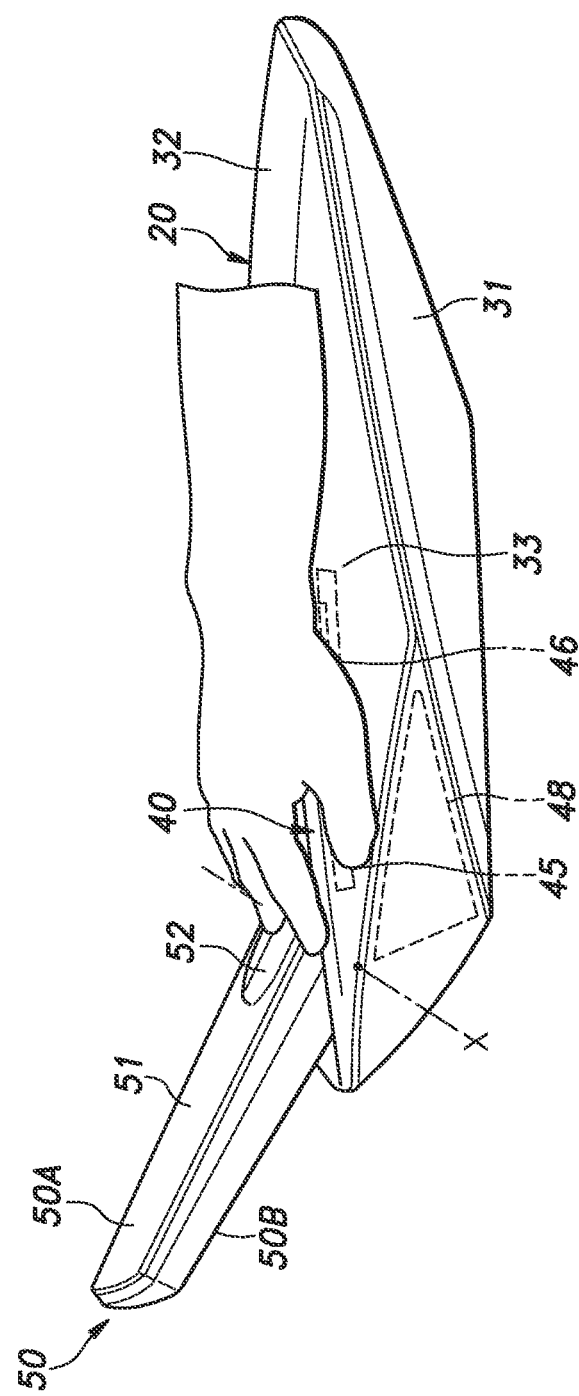
FIG. 10 is an explanatory view showing the positions of the occupant's fingers when the occupant uses the operation interface as an armrest.

In order to operate the operation interface 48, an occupant needs to hold the gripper 40 in such a manner that both the first sensor 45 and the second sensor 46 can detect the fingers, as shown in FIG. 7. As a result, even in case where the occupant unintentionally touches the operation interface 48 when the occupant places the occupant's finger on the gripper 40 in order to close the door as shown in FIG. 9, the device does not cause any in-vehicle device 21 to operate. Specifically, when the occupant places the occupant's fingers on the gripper 40 in order to close the door, the first sensor 45 detects the occupant's finger, and the second sensor 46 does not. When an occupant uses the operation device 20 as an armrest and places the occupant's hand on the gripper 40 as shown in FIG. 10, the second sensor 46 detects the occupant's finger, and the first sensor 45 does not. These features can prevent the occupant's incorrect operation form occurring in a certain way.

The main body side surface 33 includes the inclined surface 43, and the second sensor 46 is located in the inclined surface 43. Due to this configuration, when an occupant holds the gripper 40 from above with the fingers, the occupant's palm comes into contact with the second sensor 46. As a result, the second sensor 46 can appropriately detect that the occupant holds the gripper 40.

The operation interface 48 is located below the second sensor 46. This configuration allows an occupant to operate the operation interface 48 with the first finger while holding the gripper with the palm and the second to fifth fingers.

In other embodiments, the controller 55 may control at least one in-vehicle device 21 in response to an occupant's turning operation of the upper plate 50. In this case, the upper plate 50 is rotatably supported by the main body 31 so that the upper plate 50 is rotatable about the rotation axis X, by respective limit angles to one side (downwards) or to the other side (upward). The upper plate 50 is urged by an urging device toward the usable position. Preferably, a rotation angle sensor for detecting the rotation angle of the upper plate 50 is provided between the main body 31 and the upper plate 50, and the controller 55 controls the in-vehicle device 21 based on a signal from the rotation angle sensor. In this case, the controller 55 may control the in-vehicle device 21 based on a signal from the rotation angle sensor regardless of signals from the first sensor 45 and the second sensor 46.

Figure 11:
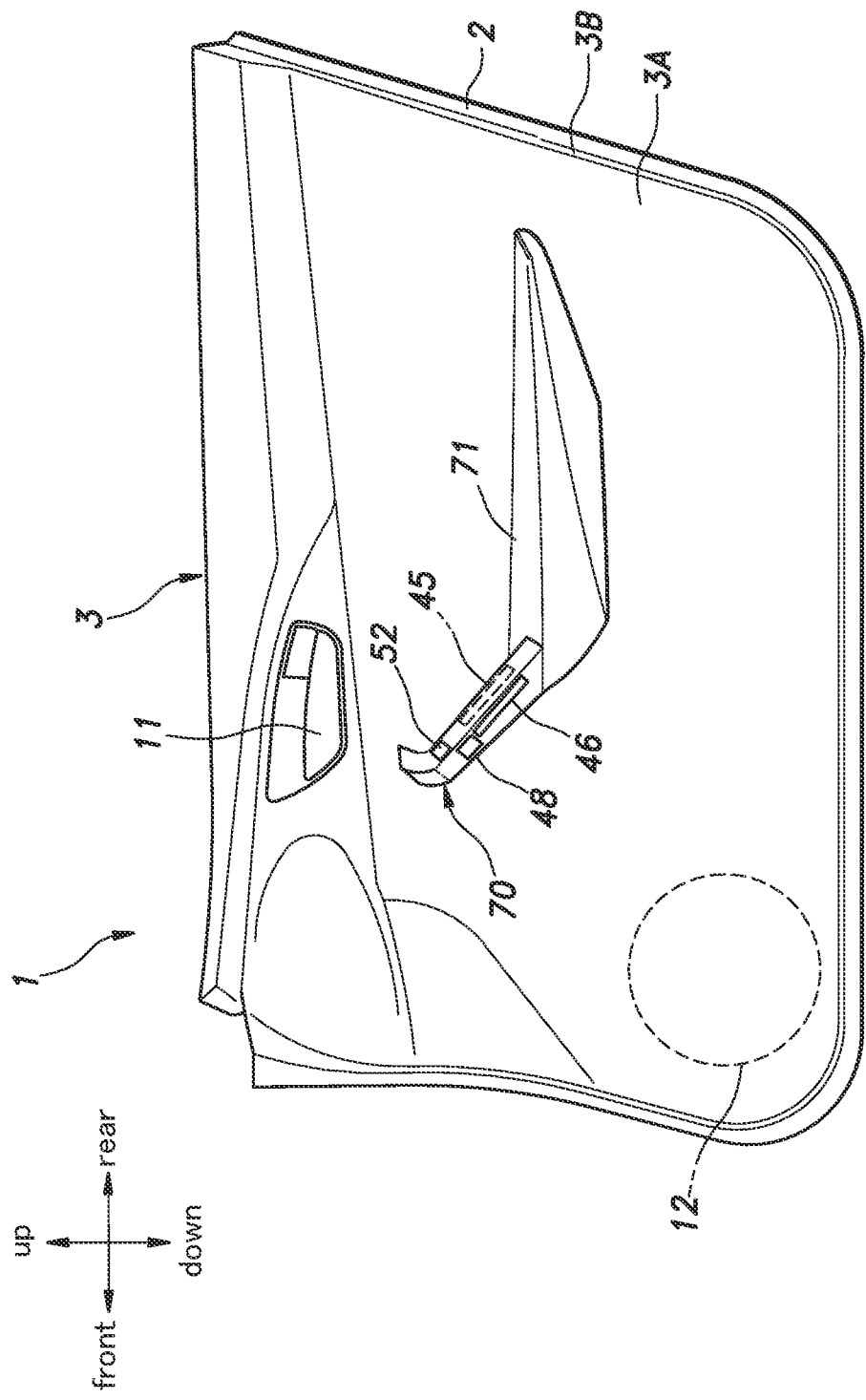
FIG. 11 is a side view of a vehicle door according to a second embodiment of the present invention.

Although, in the above-described embodiments, the gripper 40 is formed by one of the recess side walls 37 that define the recess 35, the gripper 40 may be configured to have a different shape. For example, according to second embodiment shown in FIG. 11, the gripper 40 may be a rod-shaped handle 70 coupled to the trim body 3A. In some cases, the handle 70 of the second embodiment may extend in the front-rear direction and have a front end and a rear end both coupled to the trim body 3A. A middle portion of the handle 70 and the trim body 3A define a space therebetween. The first sensor 45, the second sensor 46, and the operation interface 48 may be provided on the middle portion of the handle 70. In this case, the handle 70 is used as an operation device. The handle 70 may be formed integrally with the trim body 3A. Alternatively, the handle 70 may be formed as a separate component from the trim body 3A and may be connected to the trim body 3A by a screw or other coupling means. An armrest portion 71 may be connected to the rear end of the handle 70 and extend rearward. The armrest portion 71 extends inward from the interior side surface of the trim body 3A.

The handle 70 may be inclined upward from the rear end to the front end. The first sensor 45 and the second sensor 46 may be provided on an outer surface (facing the space between the handle 70 and the trim body 3A) and an inner surface (facing the interior of the vehicle) of the handle 70, respectively. The first sensor 45 and the second sensor 46 may be located at a same height. The operation interface 48 is provided frontward of the second sensor 46 on the inner surface of the handle 70. The operation interface 48 may be provided above the second sensor 46 on the inner surface of the handle 70. The selection interface 52 is provided on the upper surface of the handle 70. The selection interface 52 may be provided frontward of the operation interface 48. More specifically, the rear end of the selection interface 52 may be provided frontward of the front end of the operation interface 48. Preferably, when the occupant holds the handle 70 with the occupant's palm and third to fifth fingers, the operation interface 48 is located at a location where the occupant's first finger can reach, while the selection interface 52 is located at a location where the occupant's second finger can reach.

Figure 12:
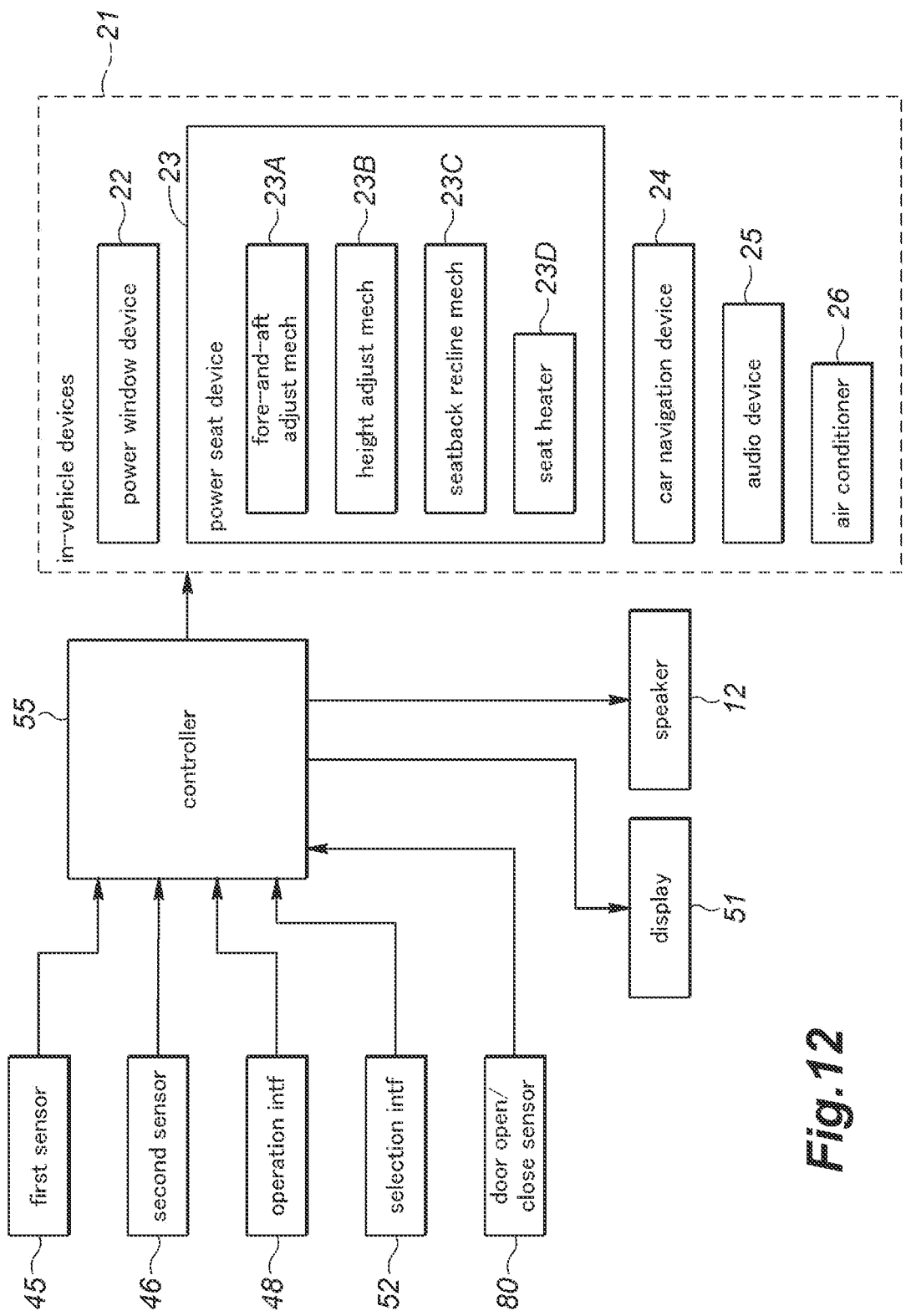
FIG. 12 is a block diagram showing a configuration of an operation device according to a third embodiment of the present invention.

In a third embodiment shown in FIG. 12, the controller 55 may be connected to a door open/close sensor 80. The door open/close sensor 80 is provided between the vehicle door 1 and the vehicle body, and provides a signal indicating an open or closed state of the vehicle door 1 to the controller 55. In some embodiments, the door open/close sensor 80 may be a push switch. When the vehicle door 1 is in the closed state, the sensor is pushed by the vehicle door 1 and in a turned-on state (outputting an on-state signal). When the vehicle door 1 is in the open state, the sensor is separated from the vehicle door 1 and in a turned-off state (outputting an off-state signal). The door open/close sensor 80 may be provided at a hinge portion which rotatably supports the vehicle door 1 with respect to the vehicle body, or provided at the free end of the vehicle door 1.

When both the first sensor 45 and the second sensor 46 detect the occupant and the door open/close sensor 80 provides a signal indicating that the vehicle door 1 is in the closed state, the controller 55 allows the selected in-vehicle device 21 to be controlled based on the signal from the operation interface 48.

Figure 13:
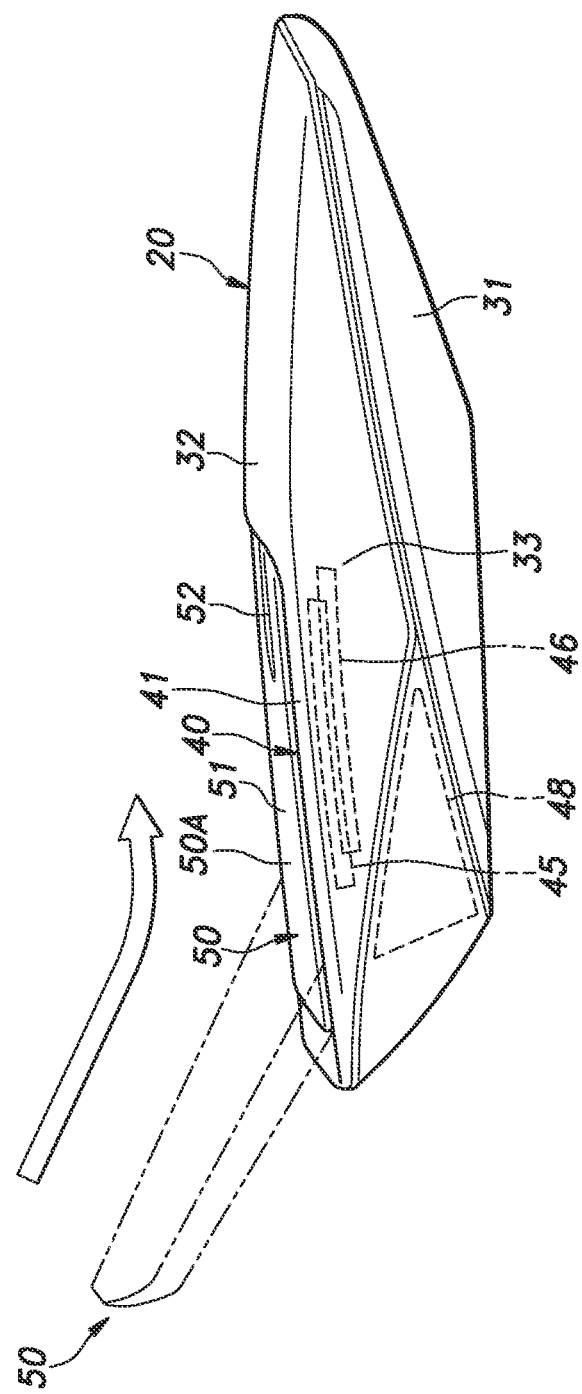
FIG. 13 is a perspective view of an operation device according to a fourth embodiment of the present invention.

In the above-described embodiment, the upper plate 50 is configured to rotate about the rotation axis X with respect to the main body 31 between the usable position and the accommodated position. However, in a fourth embodiment shown in FIG. 13, the upper plate 50 may be provided on the main body 31 such that the upper plate 50 is slidable between the usable position and the accommodated position. In this case, guide rails (not shown) may be provided on the recess side walls 37, and corresponding engaging portions for engaging with the guide rails provided on the both sides of the upper plate 50. In the accommodated position, the top surface 50A of the upper plate 50, on which the display 51 and the selection interface 52 are located, faces upward. The upper plate 50 can slide backward from the usable position (FIG. 2) to reach the accommodated position (FIG. 13). When the upper plate 50 slides backward, the inclination (angle) of the top surface 50A of the upper plate 50 is changed such that the top surface 50A becomes horizontal. In this case, the display 51 and the selection interface 52 can be used even when the upper plate 50 is in the accommodated position.

The operation interface 48 may be provided with a guide feature 90 for allowing an occupant to recognize a proper operation direction. The guide feature 90 may be a feature in which a plurality of convex portions or concave portions are formed intermittently, or a feature in which continuous convex portions or concave portions are formed. In a fifth embodiment shown in FIG. 14, the guide feature 90 may be a ridge (rib) extending to indicate a proper operation direction. The guide feature 90 may partially extend in the front-rear direction and also partially extend in the up-down direction at the front end portion thereof. An occupant can perform an input operation by swiping along the guide feature 90 with the first finger. In other embodiments, the guide feature 90 may be cross-shaped.

Figure 14:
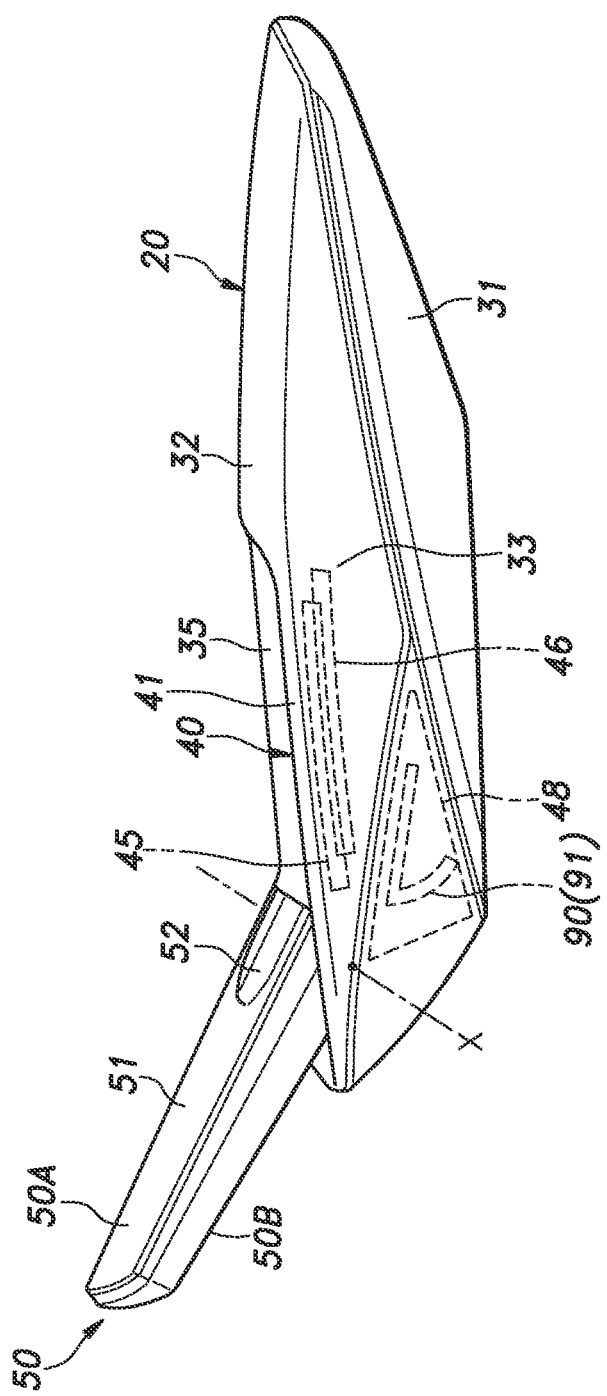
FIG. 14 is a perspective view of an operation device according to a fifth embodiment of the present invention.
Figure 15:
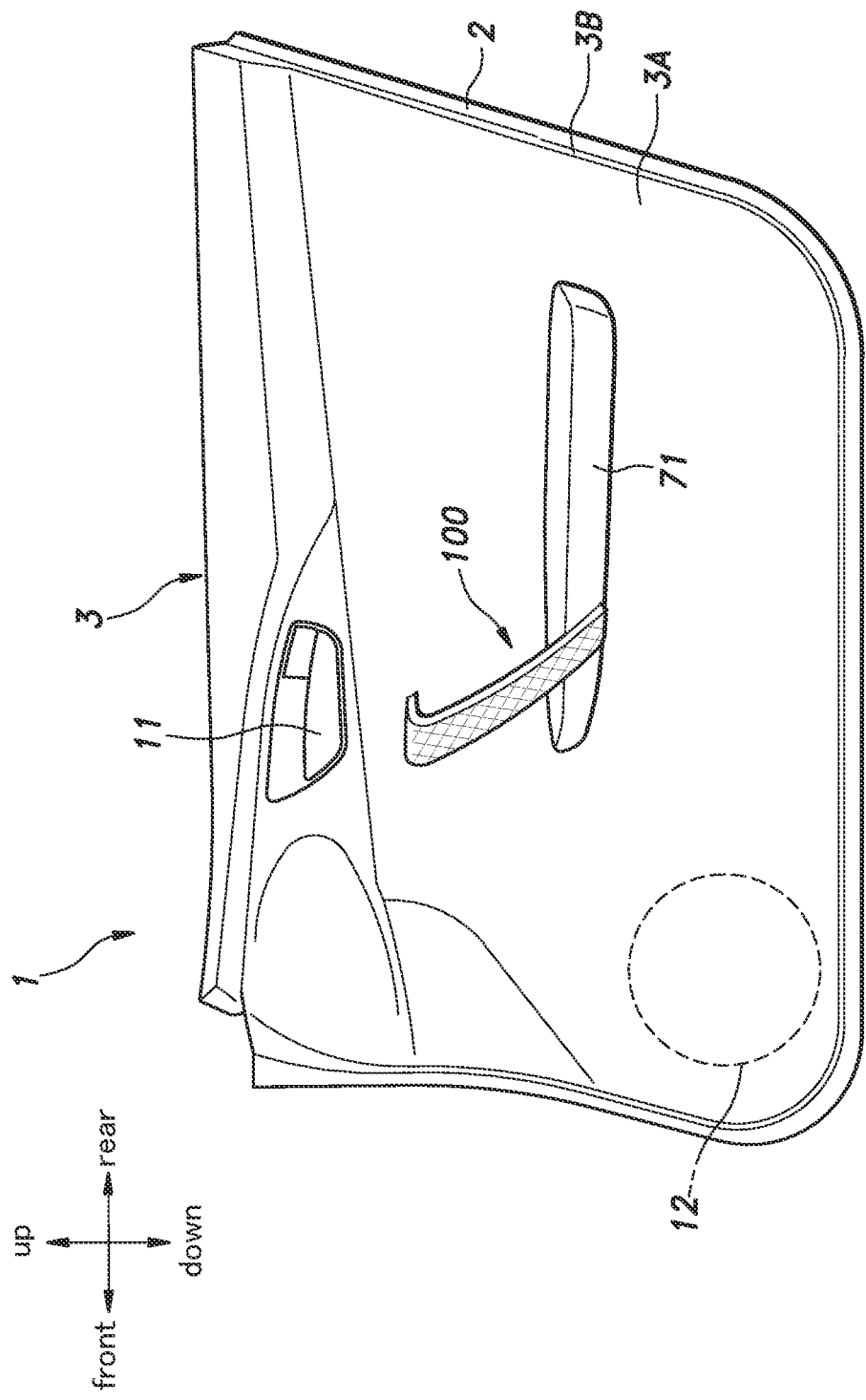
FIG. 15 is a side view of a vehicle door according to a sixth embodiment of the present invention.

The operation interface 48 may be provided with an illumination device 91 for allowing an occupant to recognize an operation direction. The illumination device 91 may be formed, for example, by a plurality of LEDs or a combination of LEDs and a tight guide. As shown in FIG. 14, the illumination devices 91 may be disposed along the operation direction. The illumination device 91 may partially extend in the front-rear direction and also partially extend in the up-down direction at the front end portion thereof. An occupant can check the emitted light from the illumination device 91 and perform an input operation by swiping the operation interface 48 in the direction indicated by light with the first finger.

An operation device 100 according to a sixth embodiment of the present invention will be described. A vehicle door 1 to which the operation device 100 is attached has a similar configuration to the vehicle door 1 of the first embodiment. Thus, like reference numerals refer to like parts or elements of the vehicle door of the first embodiment, and detailed descriptions related to such parts or elements will be omitted.

As shown in FIGS. 1.5 and 16, an armrest portion 71 is provided at a vertically middle portion of a trim body 3A of a door trim 3 so that the armrest portion 71 projects towards the interior of the vehicle and extends in the front-rear direction on the interior side surface of the trim body 3A. A rod-shaped handle 101 is provided on the interior side surface of the trim body 3A. The handle 101 extends in the front-rear direction and is coupled to the trim body 3A at the front and rear ends thereof in the present embodiment, the rear end of the handle 101 is coupled to the armrest portion 71 and also coupled to the trim body 3A via the armrest portion 71. The front end of the handle 101 is located above the rear end, and the handle 101 is inclined upward from the rear end toward the front end. The middle portion of the handle 101 along a longitudinal direction thereof and the trim body 3A define a space therebetween. As a result, an occupant can hold the entire circumference of the handle 101 with the fingers. The handle 101 may have any cross-sectional shape such as a circle, an ellipse, or a rectangle.

Figure 17:
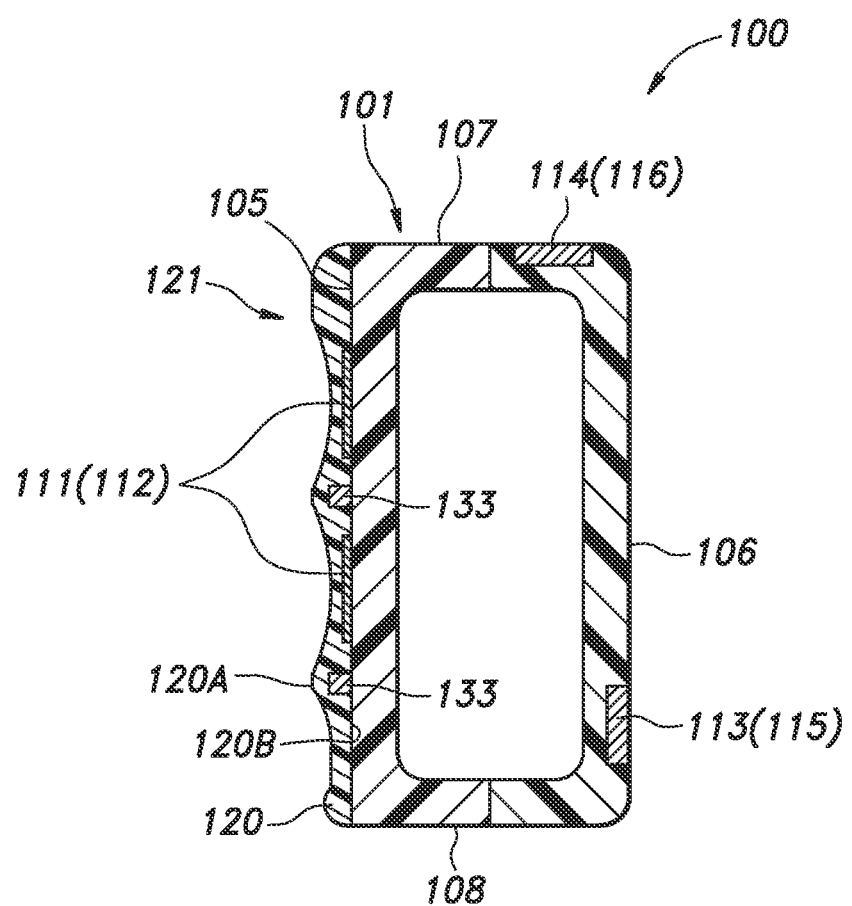
FIG. 17 is a cross-sectional view of the handle of the sixth embodiment.

As shown in FIG. 17, the handle 101 may be comprised primarily of an inner component and an outer component, which components form the inner and outer portions of the handle, respectively. These two components of the handle 101 define a space therebetween at their center portions. That is, the handle 101 has a hollow shape. The handle 101 is preferably formed of a plastic material.

The handle 101 has an inner side surface 105 facing the interior of the vehicle, an outer side surface 106 facing the space (and the trim body 3A), a lower side surface 107 facing downward and frontward, and an upper side surface 108 facing upward and rearward. The inner side surface 105 is connected to both the lower side surface 107 and the upper side surface 108. The outer side surface 106 is connected to both the lower side surface 107 and the upper side surface 108. The inner side surface 105, the lower side surface 107, and the upper side surface 108 may be connected to each other by smooth curved surfaces. Similarly, the outer side surface 106 and the lower side surface 107 and the upper side surface 108 may be connected to each other by smooth curved surfaces. Each of the inner side surface 105, the outer side surface 106, the lower side surface 107, and the upper side surface 108 may be formed to be either a flat surface or a curved surface. The inner side surface 105, the outer side surface 106, the lower side surface 107, and the upper side surface 108 face towards different directions from each other.

Figure 16:
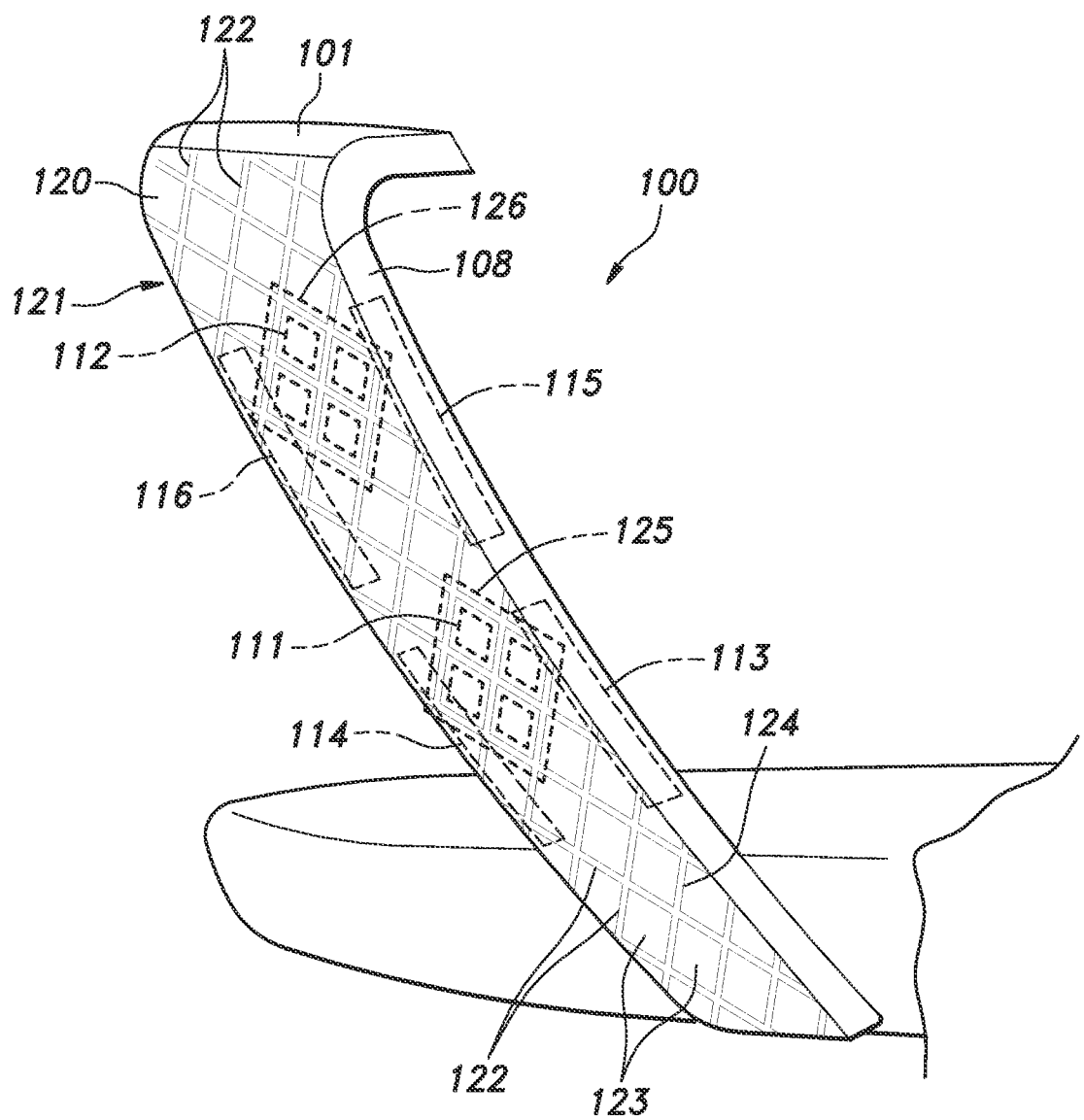
FIG. 16 is a perspective view of the operation device of the sixth embodiment.
Figure 20:
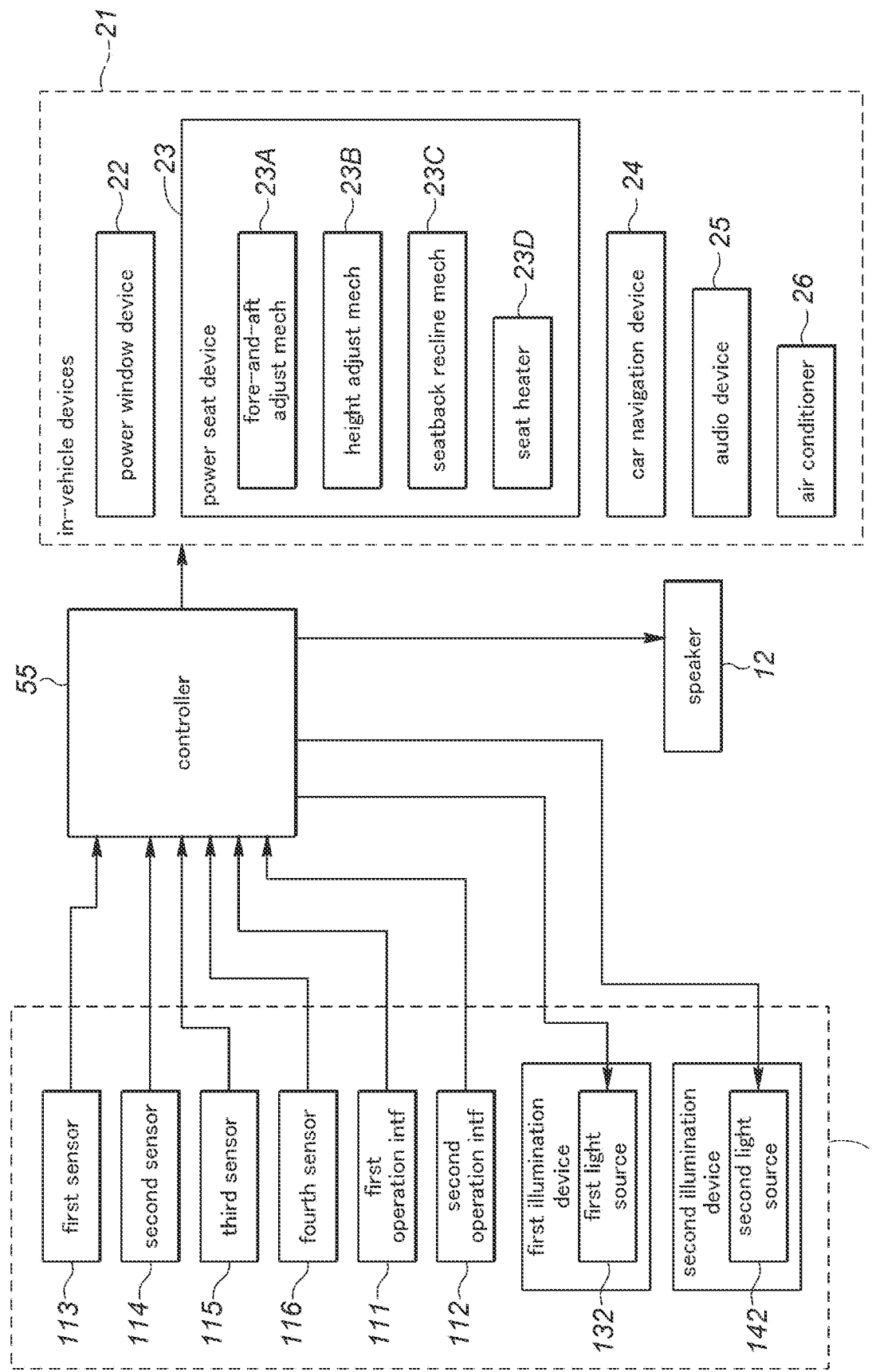
FIG. 20 is a block diagram showing the operation device and the in-vehicle devices.

As shown in FIG. 16, the handle 101 is provided with a first operation interface 111, a second operation interface 112, a first sensor 113, a second sensor 114, a third sensor 115, and a fourth sensor 116. The first operation interface 111 and the second operation interface 112 may have the same configuration as the operation interface 48 of the first embodiment. In the present embodiment, the first operation interface 111 and the second operation interface 112 are capacitive touch panels. The first to fourth sensors 113 to 116 are sensors for detecting the fingers of an occupant, and may have the same configuration as the first and second sensors 45 and 46 of the first embodiment. In the present embodiment, the first to fourth sensors 113 to 116 are capacitance sensors. As shown in FIG. 20, the first and second operation interfaces 111 and 112 and the first to fourth sensors 113 to 116 are connected to a controller 55.

As shown in FIGS. 16 and 17, the first sensor 113 is provided at the rear portion of the outer side surface 106 (facing the space) of the handle 101. The second sensor 114 is provided on one of the inner side surface 105 (facing the interior of the vehicle), the lower side surface 107, and the upper side surface 108, which are different from the outer side surface 106 of the handle 101. In the present embodiment, the second sensor 114 is provided at the rear portion of the lower side surface 107. The first sensor 113 and the second sensor 114 are disposed to extend along the longitudinal direction of the handle 101 so as to at least partially overlap each other when viewed from a vehicle cross direction. Each of the first sensor 113 and the second sensor 114 is located so as to be capable of detecting the occupant's hand (fingers) when the occupant holds the rear portion of the handle 101.

The third sensor 115 is provided at the front portion of the outer side surface 106 of the handle 101. Thus, the third sensor 115 is located frontward of the first sensor 113. The fourth sensor 116 is provided on one of the inner side surface 105, the lower side surface 107, and the upper side surface 108, which surfaces are different from the outer side surface 106 of the handle 101. In the present embodiment, the fourth sensor 116 is provided at the front portion of the lower side surface 107. Thus, the fourth sensor 116 is located frontward of the second sensor 114. The third sensor 115 and the fourth sensor 116 are disposed to extend along the longitudinal direction of the handle 101 so as to at least partially overlap each other when viewed from the vehicle cross direction. Each of the third sensor 115 and the fourth sensor 116 is located so as to be capable of detecting the occupant's hand (fingers) when the occupant holds the rear portion of the handle 101.

As shown in FIG. 16, a plate-shaped surface member 120 is provided on the inner side surface 105. The surface member 120 is provided so as to cover the surface of the inner side surface 105. The surface member 120 extends in the front-rear direction along the inner side surface 105. The surface member 120 is a translucent or semipermeable member. The surface member 120 may be formed of, for example, plastic or glass.

Figure 18:
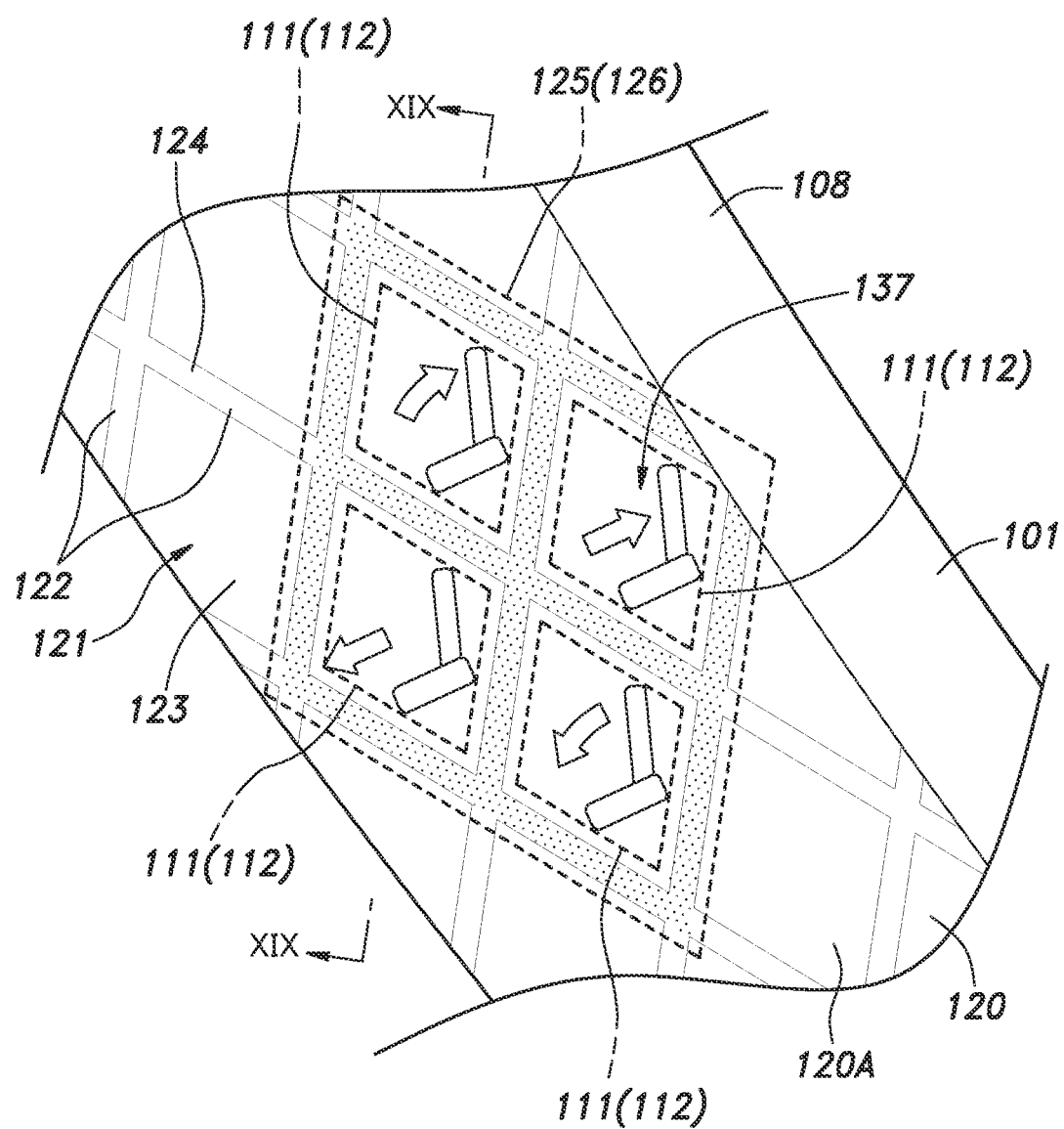
FIG. 18 is a side view of the first operation region (second operation region)
Figure 19:
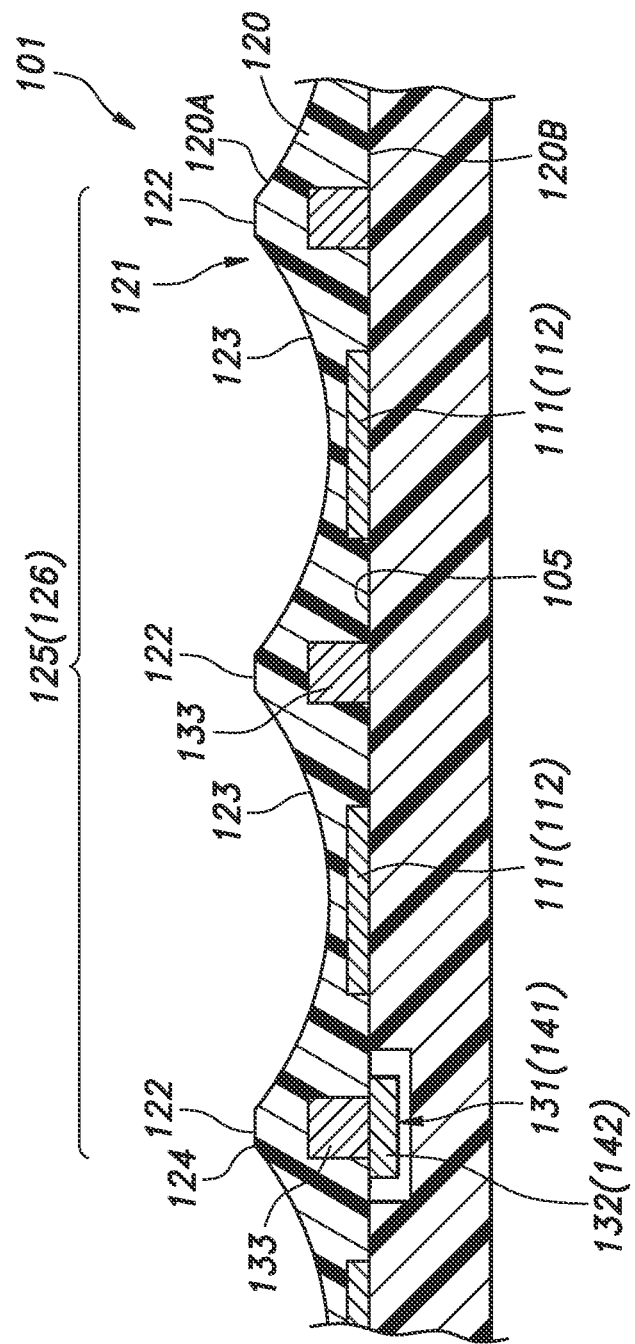
FIG. 19 is a cross-sectional view of the inner side surface of the handle (taken along line XIX-XIX in FIG. 18)

As shown in FIGS. 16, 18, and 19, a patterned indented surface 121 is formed on a surface 120A of the surface member 120. The patterned indented surface 121 has a plurality of ridges 122, which define a plurality of recesses 123. Each ridge 122 extends linearly, and the ridges 122 cooperatively form a grid consisting of a plurality of quadrangular grid elements 124 edge formed by ridges 122.

At the rear portion of the surface member 120, a first operation region 125 including the plurality of recesses 123 is provided. At the front portion of the surface member 120, a second operation region 126 including the plurality of recesses 123 is provided. In the present embodiment, each of the first operation region 125 and the second operation region 1 includes four grid elements 124 arranged to form a quadrangle. Preferably, the first operation region 125 is located such that an occupant can operate it with the occupant's first finger while holding the rear portion of the handle 101 with the occupant's palm and the second to fifth fingers.

The first operation interface 111 is provided in a portion of a back surface 120B of the surface member 120, the portion corresponding to the first operation region 125. In the present embodiment, the first operation interface 111 consists of four parts corresponding to the four recesses 123 such that each part is located at a corresponding recess 123. In other embodiments, the first operation interface 111 may be a single part corresponding to the four recesses 123. The first operation interface 111 may be provided in a receptacle portion 128 recessed in the back surface 120B of the surface member 120.

A first illumination device 131 is provided around the first operation interface 111 of the surface member 120 of the handle 101. The first illumination device 131 includes first light sources 132 and light guide members 133 for transmitting light from the first light sources 132. The light guide members 133 extend along the respective ridges 122 included in the first operation region 125 and are arranged in a grid pattern. Preferably, the light guide members 133 are arranged in the receptacle portions 134 recessed in the back surface 120B of the surface member 120. The first light sources 132 are, for example, LEDs. The first light sources 132 are provided in contact with the light guide members 133. The first light sources 132 are connected to the controller 55. The first light sources 132 receive power from the controller 55 and emit light. As shown in FIG. 19, when the first light sources 132 emit light, the light guide members 133 emit light so as to illuminate the ridges 122 included in the first operation region 125.

Each recess 123 included in the first operation region 125 is provided with a mark 137 indicating a target to be operated. The mark 137 may be, for example, an icon indicating that an operation to cause the seatback reclining mechanism 23C to tilt the seatback backward. When the first illumination device 131 is turned off, the mark 137 is visually indistinguishable from the surface member 120, and it is difficult for an occupant to recognize the mark. When the first illumination device 131 is turned on, the mark 137 is illuminated by light from the light guide members 133 and it is easy for an occupant to recognize the mark. The mark 137 may be engraved on the surface member 120, or be drawn or printed on the surface 120A of the surface member 120 with a fluorescent paint.

A second operation interface 112 is provided on a portion of the back surface 120B of the surface member 120, the portion corresponding to the second operation region 126. In the present embodiment, the second operation interface 112 may consist of four parts in the same manner as the first operation interface 111.

A second illumination device 141 is provided around the second operation interface 112 of the surface member 120 of the handle 101. The second illumination device 141 includes second light sources 142 and light guide members 133 for transmitting light from the second light sources 142 in a similar manner to the first illumination device 131.

Each recess 123 included in the second operation region 126 is provided with a mark 137 indicating a target to be operated. The mark 137 of the second operation region 126 may be configured in the same manner as that of the first operation region 125.

The first operation interface 111 includes four switches corresponding to the four recesses 123 of the first operation region 125. Similarly, the second operation interface 112 includes four switches corresponding to the four recesses 123 of the second operation region 126. When a finger of an occupant's finger comes into contact with a recess 123, which serves as one of the switches, the controller 55 detects that the occupant has operated the switch based on a signal from the first operation interface 111 or the second operation interface 112. In the present embodiment, since the first operation interface 111 and the second operation interface 112 are capacitance sensors, when an occupant's finger comes into contact with a recess 123 in the first operation region 125 or the second operation region 126, the capacitance of the first operation interface 111 or the second operation interface 112 changes. The controller 55 detects the occupant's operation on the first operation interface 111 or the second operation interface 112 based on a signal indicating the change in capacitance from the first operation interface 111 or the second operation interface 112.

The controller 55 detects whether or not the occupant's finger is in contact with (or present close to) any one of the first to fourth sensors 113 to 116 based on signals from the sensors 113 to 116.

Figure 21:
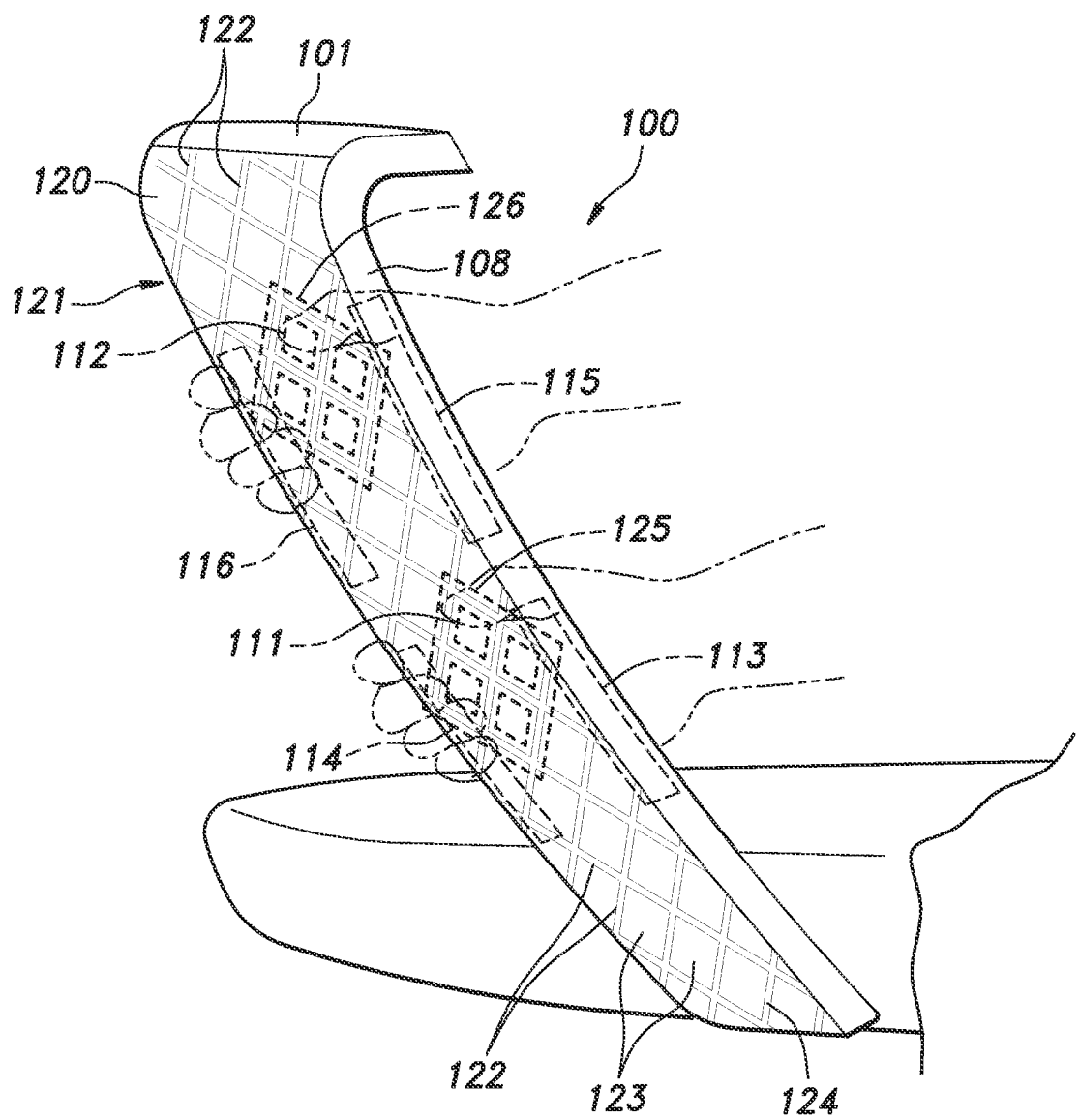
FIG. 21 is an explanatory diagram showing the positions of the occupant's fingers when the occupant operates the first operation interface or the second operation interface.

When both the first sensor 113 and the second sensor 114 detect an occupant (fingers of an occupant), the controller 55 supplies power to the first light sources 132 of the first illumination device 131. As a result, the ridges 122 in the first operation region 125 emit light in a grid pattern and the mark 137 emits light, whereby the occupant can visually recognize the first operation region 125. When both the first sensor 113 and the second sensor 114 detect the occupant, it can be assumed that the occupant is holding the rear portion of the handle 101 as shown in FIG. 21. The first operation region 125 is illuminated so that the occupant can recognize that the first operation interface 111 can be operated.

When both the first sensor 113 and the second sensor 114 detect an occupant (fingers of an occupant), the controller 55 controls the selected in-vehicle device 21 based on a signal from the first operation interface 111. Specifically, when a finger of the occupant is detected based on a signal from the first sensor 113 and also a finger of the occupant is detected based on a signal from the second sensor 114, the controller 55 controls the selected in-vehicle device 21 based on a signal from the first operation interface 111. When at least one of the first sensor 113 and the second sensor 114 does not detect the occupant, the controller 55 prohibits the in-vehicle devices 21 from being controlled based on a signal from the first operation interface 111. Specifically, when no occupant's finger is detected based on a signal from the first sensor 113 and or when no occupant's finger is detected based on a signal from the second sensor 114, the controller 55 prohibits the in-vehicle devices 21 from being controlled based on a signal from the operation interface 111.

When both the third sensor 115 and the fourth sensor 116 detect an occupant (fingers of an occupant), the controller 55 supplies power to the second light sources 142 of the second illumination device 141. As a result, the ridges 122 in the second operation region 126 emit light in a grid pattern and the mark emits light, whereby the occupant can visually recognize the second operation region 126. When both the third sensor 115 and the fourth sensor 116 detect the occupant, it can be assumed that the occupant is holding the front portion of the handle 101 as shown in FIG. 21.

When both the third sensor 115 and the fourth sensor 116 detect an occupant (fingers of an occupant), the controller 55 controls the selected in-vehicle device 21 based on a signal from the second operation interface 112. Specifically, when a finger of the occupant is detected based on a signal from the third sensor 115 and also a finger of the occupant is detected based on a signal from the fourth sensor 116, the controller 55 controls the selected in-vehicle device 21 based on a signal from the second operation interface 112. When at least one of the third sensor 115 and the fourth sensor 116 does not detect the occupant, the controller 55 prohibits the in-vehicle devices 21 from being controlled based on a signal from the second operation interface 112. Specifically, when no occupant's finger is detected based on a signal from the third sensor 115 and or when no occupant's finger is detected based on a signal from the fourth sensor 116, the controller 55 prohibits the in-vehicle devices 21 from being controlled based on a signal from the second operation interface 112.

Preferably, the control performed by the controller 55 based on a signal from the first operation interface 111 is different from that based on a signal from the second operation interface 112. For example, the controller 55 may be configured to control the fore-and-aft adjustment mechanism 23A and the seatback reclining mechanism 23C in response to a signal from the first operation interface 111, while controlling the height adjustment mechanism 23B and the seat heater 2317 in response to a signal from the second operation interface 112. Furthermore, the controller 55 may be configured to select the in-vehicle device 21 to be operated based on a signal from the second operation interface 112, and determine the direction and amount of movement of the selected in-vehicle device 21 based on a signal from the first operation interface 111.

In an operation device 100 according to a variant of the sixth embodiment as shown in FIG. 22, the first operation interface 111 and the first illumination device 131 may be implemented by a touch panel display 150. The touch panel display 150 is used to detect an occupant's contact operation and also illuminate the first operation region 125 by emitting light. The touch panel display 150 is provided on the hack surface 120B of the surface member 120. The touch panel display 150 can serve as the first operation interface 111 in the form of a switch at a location corresponding to each recess 123 in the first operation region 125, for detecting the contact (or approach) of a finger of an occupant. The touch panel display 150 can also serve as the first illumination device 131 by emitting light from a location corresponding to each ridge 122 in the first operation region 125. Similarly, the second operation interface 112 and the second illumination device 141 can also be implemented by the touch panel display 150.

An operation device 200 according to a seventh embodiment of the present invention will be described. A vehicle door 1 to which the operation device 200 is attached has a similar configuration to the vehicle door 1 of the first embodiment. Thus, like reference numerals refer to like parts or elements of the vehicle door of the first embodiment, and detailed descriptions related to such parts or elements will be omitted.

As shown in FIG. 23, the operation device 200 is provided at a vertically middle portion of the interior side surface of the trim body 3A. Like the operation device 20 of the first embodiment, the operation device 200 is a device for receiving an occupant's input to operate one or more in-vehicle devices 21.

As shown in FIG. 24, the operation device 200 includes a main body 231, which is an outer shell. The main body 231 is formed of a plastic material. The main body 231 is attached to the vertically middle portion of the interior side surface of the trim body 3A and extends in the front-rear direction. The main body 231 may be connected to the trim body 3A by screws or any other coupling means. Alternatively, the main body 231 may be integrally formed with the trim body 3A.

The main body 231 of the operation device 200 has a main body upper surface 232 at the upper portion of the main body and a main body side surface 233 at the interior side end of the main body, where the main body upper surface 232 faces upward and extends inward with respect to the trim body 3A, and the main body side surface 233 faces towards the interior of the vehicle. The main body upper surface 232 can support a forearm of an occupant, and thus can be used as an armrest.

As shown in FIGS. 24 and 25, a recess 235 is formed on the upper surface of the main body 231 of the operation device 200. The recess 235 extends in the front-rear direction, and has a recess front part 235A and a recess rear part 235B. The recess 235 is defined by a recess bottom wall 236 and recess side walls 237 extending upward from the recess bottom wall 36. A first side surface 238 is an inner surface of the interior side part of the recess side wall 237, the first side surface 238 facing outward along the cross direction of the vehicle. The first side surface 238 extends in the front-rear direction, and has a first side surface front part 238A and a first side surface rear part 238B.

The recess front part 235A has a similar width in the cross direction of the vehicle than the recess rear part 235B. A shoulder surface 238C facing rearward is provided at the boundary between the first side surface front part 238A and the first side surface rear part 238B.

As shown in FIG. 25A, the first side surface front part 238A is inclined to extend downward and outward along the cross direction the vehicle, which can make it difficult for an occupant to hold the occupant's fingers on the first side surface front part 238A. Thus, it is difficult for an occupant to grip the recess front part 235A with the occupant's fingers in order to open/close the vehicle door 1.

As shown in FIG. 25B, a protruding part 239 extends outward along the cross direction of the vehicle at the upper end portion of the first side surface rear part 238B. In the main body upper surface 232, a first upper surface 241 is a surface extending between the upper end of the first side surface 238 and the upper end of the main body side surface 233. The first upper surface 241 connects the upper end of the first side surface 238 to that of the main body side surface 233. A gripper 240 is formed by the first side surface rear part 238B, the first upper surface 241, and the main body side surface 233. The gripper 240 is a wall portion protruding upward and extending in the front-rear direction such that an occupant can grip/hold the gripper 40 with the occupant's fingers. The occupant can hold the gripper 240 in order to open or close the vehicle door 1. Thus, the recess rear part 235B is used as a pull pocket.

As shown in FIG. 24, a first sensor 245 for detecting a finger(s) of an occupant is provided in a portion of the first side surface 38, the portion corresponding to the recess front part 235A along the front-rear direction. The first sensor 245 is a sensor configured to detect the contact or approach of a finger of an occupant, and examples of sensors that can be used as the first sensor 245 include a capacitance sensor, a piezoelectric sensor, a membrane switch, and an infrared beam switch. The first sensor 245 extends in the front-rear direction on the first upper surface 241. The first sensor 245 is connected to the controller 55.

A first operation interface 248 and a second operation interface 249 are provided on a portion of the main body side surface 233, the portion corresponding to the recess front part 235A along the front-rear direction. The first operation interface 248 is configured to receive an occupant's input to operate at least one in-vehicle device 21. The first operation interface 248 is a switch to be operated by an occupant's finger, and examples of the first operation interface 248 include a capacitance sensor, a piezoelectric sensor, and a membrane switch. In the present embodiment, the first operation interface 248 is a capacitive touch panel, and receives a touch operation performed thereon by the occupant's finger. The second operation interface 249 is a switch operable by an occupant's finger, and examples of the second operation interface 249 include a tactile switch and a push button switch.

Preferably, the first operation interface 248 is located frontward of the second operation interface 249. The first operation interface 248 and the second operation interface 249 are provided at the same height on the main body side surface 233. The first operation interface 248 and the second operation interface 249 are connected to the controller 55 in the same manner as the first embodiment.

The first operation interface 248 includes a plurality of input parts 248A. Each input part 248A is surrounded by a corresponding rib 248B projecting from the main body side surface 233. Thus, the plurality of input parts 248A are partitioned from each other by the ribs 248B. This allows an occupant to, not visually, but tactually find the ribs 248B and the input parts 248A with the occupant's fingers. The input parts 248A may be provided at the bottom of the respective recesses formed on the main body side surface 233. Preferably, the surface of each input part 248A is provided with a protruded feature that can be felt by the occupant's finger.

Each of the input parts 248A is provided for a corresponding one of the fore-and-aft adjustment mechanism 23A, the height adjustment mechanism 23B, the seatback reclining mechanism 23C, and the seat heater 24D, and outputs signals therefor. An occupant can control each of the fore-and-aft adjustment mechanism 23A, the height adjustment mechanism 23B, the seatback reclining mechanism 23C, and the seat heater 24D by operating a corresponding input part 248A to adjust the position, angle, and temperature of the seat.

The second operation interface 249 includes a plurality of input parts 249A, which are four input parts 249A in the present embodiment. Each of the input parts 249A is a switch for operating a corresponding power window device 22 for one of the seats. The input parts 249A are arranged adjacent to each other. Each input part 249A partly protrudes from the main body side surface 233.

The first operation interface 248 is located at a location where the occupant's first finger can reach while the second to fourth fingers of the occupant are in contact with the first side surface front part 238A of the recess front part 235A. Furthermore, first operation interface 248 is located at a location where the occupant's first finger cannot reach while the second to fourth fingers of the occupant are in contact with the first side surface rear part 238B of the recess rear part 235B.

A display part 250 for indicating operation statuses of the in-vehicle devices 21 is provided frontward of the recess 235 on the main body upper surface 232. The display part 250 may be a display screen configured to indicate the operation of each in-vehicle device 21 by using a change in light emission or an animation.

The controller 55 detects whether or not an occupant's finger is in contact with the first sensor 245, or whether or not the finger is present close to the first sensor 245 based on a signal from the first sensor 245. When the first sensor 245 detects an occupant (a finger of an occupant), the controller 55 controls the in-vehicle device 21 corresponding to the operated input part 248A, based on a signal from the first operation interface 248. When the first sensor 245 does not detect the occupant, the controller 55 prohibits the in-vehicle devices 21 from being controlled based on a signal from the operation interface 248. Specifically, when no occupant's finger is detected based on a signal from the first sensor 245, the controller 55 prohibits the in-vehicle devices 21 from being controlled based an a signal from the first operation interface 248.

As the first side surface front part 238A is inclined, it is difficult for an occupant to hold the occupant's fingers on the first side surface front part 238A. However, as the first side surface rear part 238B includes the protruding part 239, it is easy for an occupant to hold the occupant's fingers on the first side surface rear part 238B. Accordingly, an occupant naturally uses the recess rear part 235B as a pull pocket when opening or closing the vehicle door 1. As a result, when the occupant is closing the vehicle door 1, the occupant's fingers become unlikely to be in contact with the first sensor 245 and the first operation interface 248, thereby preventing incorrect operation on the first operation interface 248.

The shoulder surface 238C is provided at the boundary between the first side surface front part 238A and the first side surface rear part 238B. Thus, when an occupant holds the fingers on the first side surface rear part 238B in order to close the vehicle door 1, the occupant's finger(s) abuts the shoulder surface 238C, thereby preventing the fingers from shifting to the first side surface front part 238A. Thus, the shoulder surface 238C helps keeping the occupant's fingers away from the first sensor 245 and the first operation interface 248 to thereby prevent incorrect operation on the first operation interface 248.

Figure 26:
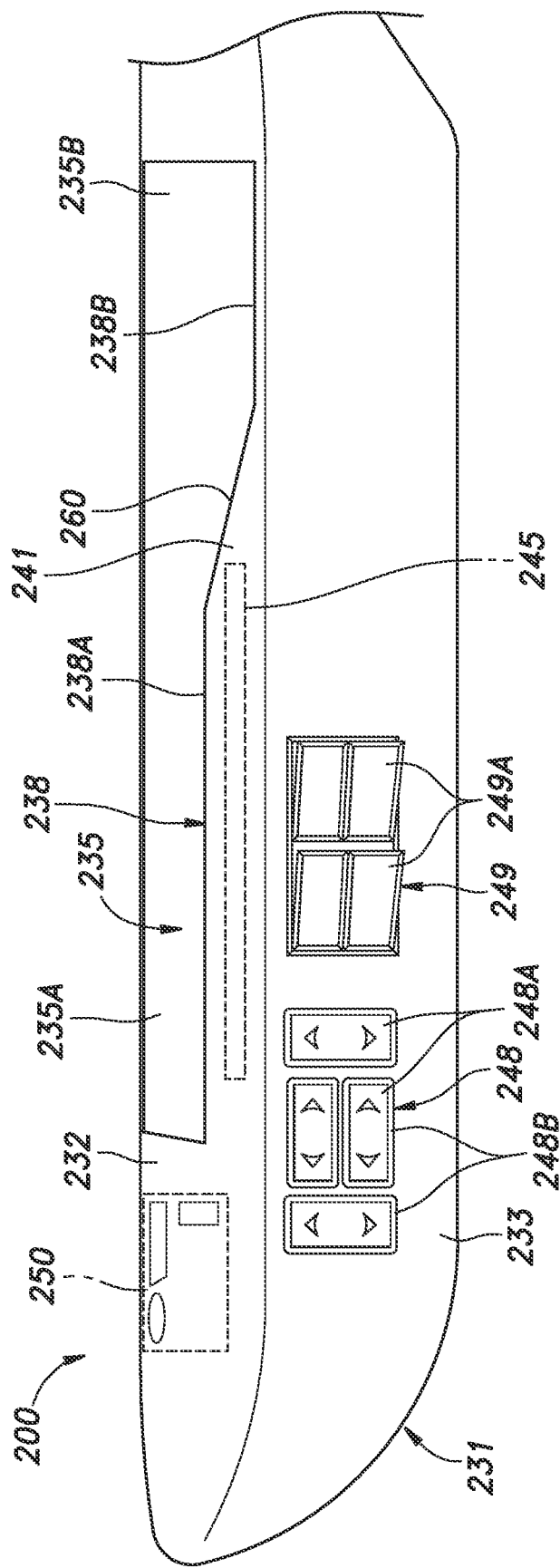
FIG. 26 is a perspective view of an operation device according to a variant of the seventh embodiment.

In an operation device 200 according to a variant of the seventh embodiment as shown in FIG. 26, the first side surface 238 may include an inclined surface 260 in place of the shoulder surface 238C. The inclined surface 260 is inclined to extend rearward and inward along the cross direction of the vehicle. In this case, when an occupant holds the fingers on the first side surface front part 238A in order to close the vehicle door 1, the inclined surface 260 directs the fingers from the first side surface front part 238A towards the first side surface rear part 238B. Thus, when an occupant holds the fingers on the first side surface rear part 238B in order to close the vehicle door 1, the inclined surface 260 helps keeping the fingers on the first side surface rear part 238B, preventing them from shifting frontward.

As shown in FIG. 27, the first side surface front part 238A may be provided with a guide groove 270 that is recessed towards the interior side of the vehicle. The upper end of the guide groove 270 reaches the first upper surface 241. The first side surface front part 238A may be provided with a plurality of guide grooves 270. The guide groove 270 may have a semicircular or rectangular cross section when viewed from the above. An occupant can hold the second to fourth fingers in the guide groove 270 to thereby properly place the occupant's first finger at the first operation interface 248.

Glossary 1 vehicle door
3 door trim
11 door handle
20 operation device
21 in-vehicle device
31 main body
32 main body upper surface
33 main body side surface
35 recess
38 first side surface
39 protruding part
40 gripper
41 first upper surface
43 inclined surface
45 first sensor
46 second sensor
48 operation interface
50 upper plate
51 display
52 selection interface
55 controller
70 handle
100 operation device
101 handle
105 inner side surface
106 outer side surface
111 first operation interface
112 second operation interface
113 first sensor
114 second sensor
115 third sensor
116 fourth sensor
131 first illumination device
141 second illumination device
200 operation device
235 recess
235A recess front part
235B recess rear part
236 recess bottom wall
237 recess side wall
238 first side surface
238A first side surface front part
238B first side surface rear part
238C shoulder surface
239 protruding part
240 gripper
245 first sensor
248 first operation interface
249 second operation interface
250 display part
260 inclined surface
270 guide groove
X rotation axis

The invention claimed is:

1. An operation device for use in a vehicle, the vehicle having a front-rear direction and a cross direction, the operation device comprising:
   a gripper provided on an inner surface of a door of the vehicle, the gripper extending in the front-rear direction and including an outer side surface, an inner side surface, and an upper surface which connects an upper edge of the outer side surface to that of the inner side surface;
   an operation interface provided on the inner side surface of the gripper for receiving an operation input entered by an occupant to operate at least one in-vehicle device;
   a first sensor provided on the outer side surface for detecting a finger of the occupant;
   a second sensor provided on at least one of the inner side surface and the upper surface for detecting a finger of the occupant; and
   a controller connected to the operation interface, the first sensor, the second sensor, and the at least one in-vehicle device,
   wherein the controller controls the at least one in-vehicle device based on a signal from the operation interface when both the first sensor and the second sensor detect the occupant, and wherein the controller prohibits the at least one in-vehicle device from being controlled based on a signal from the operation interface when at least one of the first sensor and the second sensor does not detect the occupant.

2. The operation device according to claim 1, wherein the second sensor is provided on the outer side surface.

3. The operation device according to claim 2, wherein the first sensor and the second sensors are disposed so as to overlap each other when viewed from the cross direction.

4. The operation device according to claim 3, wherein the inner side surface includes an inclined surface at an upper part thereof, the inclined surface being inclined upward and towards the outer side of the vehicle, and
   wherein the second sensor is provided on the inclined surface.

5. The operation device according to claim 1, wherein the operation interface is located below the second sensor.

6. The operation device according to claim 1, wherein the second sensor extends in the front-rear direction, and wherein a rear end of the second sensor is located rearward of that of the operation interface.

7. The operation device according to claim 1, wherein the rear end of the second sensor is located frontward of that of the gripper.

8. The operation device according to claim 7, wherein a front end of the second sensor is located rearward of that of the gripper.

9. The operation device according to claim 1, wherein the at least one in-vehicle device includes a plurality of in-vehicle devices,
   wherein the gripper is provided with a selection interface for selecting one of the plurality of in-vehicle devices,
   wherein the operation interface and the selection interface are disposed to extend along the front-rear direction so as to at least partially overlap each other when viewed from the cross direction, and
   wherein a front end of the second sensor is located rearward of a rear end of the selection interface.

10. An operation device for use in a vehicle, the vehicle having a front-rear direction and a cross direction, the operation device comprising:
    a handle provided on an inner surface of a door of the vehicle, the handle extending in the front-rear direction to have a front end and a rear end, both the front and the rear end being connected to the door;
    a first operation interface provided on an inner side surface of the handle for receiving an operation input entered by an occupant to operate at least one in-vehicle device;
    a first sensor provided on an outer side surface of the handle for detecting a finger of the occupant;
    a second sensor provided on a surface of the handle, the surface being different from the outer side surface, for detecting a finger of the occupant; and
    a controller connected to the first operation interface, the first sensor, the second sensor, and the at least one in-vehicle device,
    wherein the controller controls the at least one in-vehicle device based on a signal from the first operation interface when both the first sensor and the second sensor detect the occupant, and wherein the controller prohibits the at least one in-vehicle device from being controlled based on a signal from the first operation interface when at least one of the first sensor and the second sensor does not detect the occupant.

11. The operation device according to claim 10, further comprising:
    a second operation interface provided on the inner side surface of the handle for receiving an operation input entered by the occupant to operate at least one of the in-vehicle devices;
    a third sensor provided on the outer side surface of the handle for detecting a finger of the occupant; and
    a fourth sensor provided on a surface of the handle, the surface being different from the outer side surface, for detecting a finger of the occupant,
    wherein the second operation interface, the third sensor, and the fourth sensor are connected to the controller, and
    wherein the controller controls the at least one in-vehicle device based on a signal from the second operation interface when both the third sensor and the fourth sensor detect the occupant, and wherein the controller prohibits the at least one in-vehicle device from being controlled based on a signal from the second operation interface when at least one of the third sensor and the fourth sensor does not detect the occupant.

12. The operation device according to claim 11, the control performed by the controller based on a signal from the first operation interface is different from that based on a signal from the second operation interface.

13. The operation device according to claim 11, wherein the second operation interface is located frontward of the first operation interface,
    wherein the third sensor is located frontward of the first sensor, and
    wherein the fourth sensor is located frontward of the second sensor.

14. The operation device according to claim 11, further comprising:
    a first illumination device around the first operation interface of the handle; and
    a second illumination device around the second operation interface of the handle,
    wherein the first illumination device and the second illumination device are connected to the controller,
    wherein the controller causes the first illumination device to emit light when both the first sensor and the second sensor detect the occupant, and wherein the controller causes the second illumination device to emit light when both the third sensor and the fourth sensor detect the occupant.

15. A vehicle door comprising the operation device according to claim 1.

* * * * *